(12) United States Patent
Guo et al.

(10) Patent No.: US 9,497,754 B2
(45) Date of Patent: Nov. 15, 2016

(54) CONFIGURATION AND DETECTION METHOD AND DEVICE FOR ENHANCED DOWNLINK CONTROL CHANNEL, EVOLVED NODE B AND TERMINAL

(71) Applicant: ZTE Corporation, Shenzhen, Guangdong (CN)

(72) Inventors: Senbao Guo, Shenzhen (CN); Yijian Chen, Shenzhen (CN); Yunfeng Sun, Shenzhen (CN); Bo Dai, Shenzhen (CN); Junfeng Zhang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/421,301

(22) PCT Filed: Jul. 29, 2013

(86) PCT No.: PCT/CN2013/080363
§ 371 (c)(1),
(2) Date: Feb. 12, 2015

(87) PCT Pub. No.: WO2013/170840
PCT Pub. Date: Nov. 21, 2013

(65) Prior Publication Data
US 2015/0223210 A1 Aug. 6, 2015

(30) Foreign Application Priority Data
Sep. 20, 2012 (CN) .......................... 2012 1 0351916

(51) Int. Cl.
*H04W 72/04* (2009.01)
*H04L 5/00* (2006.01)

(52) U.S. Cl.
CPC .......... *H04W 72/042* (2013.01); *H04L 5/0053* (2013.01); *H04W 72/04* (2013.01)

(58) Field of Classification Search
CPC ......... H04W 72/04; H04L 5/00; H04L 27/26
See application file for complete search history.

(56) References Cited

U.S. PATENT DOCUMENTS 9,226,278 B2 * 12/2015 Chen ...................... H04L 5/1469
2013/0039284 A1 * 2/2013 Marinier ................. H04L 5/001
370/329

(Continued)

FOREIGN PATENT DOCUMENTS

CN 102036297 A 4/2011
CN 102170646 A 8/2011

(Continued)

OTHER PUBLICATIONS

International Search Report in international application No. PCT/CN2013/080363, mailed on Oct. 17, 2013.

(Continued)

*Primary Examiner* — Xavier S Wong
(74) *Attorney, Agent, or Firm* — Oppedahl Patent Law Firm LLC

(57) ABSTRACT

Disclosed is a configuration method for an enhanced downlink control channel, which configures K ePDCCH detection clusters for a terminal, including: independently configuring an antenna port index of a corresponding demodulation reference signal (DMRS) at the time of detection of each ePDCCH detection cluster or different transmission modes of ePDCCH detection clusters of the K ePDCCH detection clusters; and/or independently configuring a scrambling sequence index of the corresponding DMRS at the time of detection of each ePDCCH detection cluster or different transmission modes of ePDCCH detection clusters of the K ePDCCH detection clusters; and/or independently configuring the correlation between a corresponding DMRS scrambling sequence at the time of detection of each ePDCCH detection cluster or different transmission modes of ePDCCH detection clusters of the K ePDCCH detection clusters and a DMRS scrambling sequence of a physical downlink shared channel PDSCH, and the like. Disclosed at the same time are a detection method and device for an enhanced downlink control channel, a configuration device for an enhanced downlink control channel, a terminal and an evolved node B. The present invention allows an ePDCCH to have stronger stability and configuration flexibility.

16 Claims, 1 Drawing Sheet

(56) References Cited

U.S. PATENT DOCUMENTS

| | | | | |
|---|---|---|---|---|
| 2013/0044727 A1* | 2/2013 | Nory | ............... | H04L 5/0092 370/330 |
| 2013/0064216 A1* | 3/2013 | Gao | ............... | H04L 5/0016 370/330 |
| 2013/0223366 A1* | 8/2013 | Papasakellariou | .. | H04W 72/042 370/329 |
| 2013/0250782 A1* | 9/2013 | Nimbalker | ............ | H04L 1/203 370/252 |
| 2015/0215908 A1* | 7/2015 | Seo | ............... | H04L 5/0048 370/329 |

FOREIGN PATENT DOCUMENTS

| | | |
|---|---|---|
| RU | 2010121838 A | 12/2011 |
| WO | 2013110040 A1 | 7/2013 |

OTHER PUBLICATIONS

English Translation of the Written Opinion of the International Search Authority in international application No. PCT/CN2013/080363, mailed on Oct. 17, 2013.
eREG I eCCE mapping for ePDCCH Aug. 5, 2012.
Remaining details of association between DM-RS ports and ePDCCH transmission Aug. 5, 2012.
PRB indication to UE for ePDCCH transmission Aug. 5, 2012.
Remaining issues of antenna ports quasi co-location definition Aug. 5, 2012.
Consideration on DCI mapping for EPDCCH Aug. 5, 2012.
Supplementary European Search Report in European application No. 13790351.4, mailed on Aug. 6, 2015.
Renesas mobile Europe Ltd, Remaining issues on quasi-colocated antenna ports, 3GPP TSG-RAN WG1 Meeting #70 R1-123589, mailed on Aug. 13, 2012.
Texas Instruments, Scrambling sequence initialization of DMRS for ePDCCH, 3GPP TSG RAN WG1 #70 R1-123196, mailed on Aug. 13, 2012.
CATT, Search space design for E-PDCCH, 3GPP TSG RAN WG1 Meeting #70 R1-123224, mailed on Aug. 13, 2012.
CATT, DMRS association issues in E-PDCCH, 3GPP TSG RAN WG1 Meeting #70 R1-123225, mailed on Aug. 13, 2012.
CATT, PUCCH resource for E-PDCCH, 3GPP TSG RAN WG1 Meeting #70 R1-123227, mailed on Aug. 13, 2012.
ZTE, Aperiodic CSI feedback modes for CoMP, 3GPP TSG RAN WG1 Meeting #70 R1-123381, mailed on Aug. 13, 2012.
Ericsson, ST-Ericsson; Search Space Aspects for ePDCCH; R1-123616; mailed on Aug. 13-17, 2012.
Samsung; Association between antenna ports and ePDCCH transmissions; R1-122249; mailed on May 21-25, 2012.
Huawei, Hisilicon; Antenna port association for ePDCCH; R1-123560; mailed on Aug. 13-17, 2012.
Huawei, Hisilicon "Usage of ePDCCH signature for ePDCCH detection", 3GPP TSG RAN WG1 Meeting #69, R1-121961, Prague, Czech Republic, May 21-25, 2012, Retrieved from the Internet: URL: http:/Iwww.3gpp.org/DynaReporUTDocExMtg-R1-69-29002.htm [retrieved on May 17, 2016], mailed on May 21-25, 2012.
Renesas Mobile Europe Ltd: "On Encoding for HARQ-ACK and Periodic CSI Multiplexing in PUCCH Format 3", 3GPP TSG RAN WG1 Meeting #70, R1-123568, Qingdao, China, Aug. 13-17, 2012, Retrieved from the Internet: URL: http://www.3gpp.org/DynaReport/TDocExMtg-R1-70-29003.htm [retrieved on May 17, 2016] mailed on Aug. 13-17, 2012.

* cited by examiner

CONFIGURATION AND DETECTION METHOD AND DEVICE FOR ENHANCED DOWNLINK CONTROL CHANNEL, EVOLVED NODE B AND TERMINAL

TECHNICAL FIELD

The disclosure relates to enhanced downlink control channel configuration and detection, and in particular to a configuring and detecting method and device for an enhanced downlink control channel, an evolved Node B (eNB), and a User Equipment (UE).

BACKGROUND

In Long Term Evolution (LTE) Release8/9 (R8/9), a Common Reference Signal (CRS) is designed for channel quality measurement and demodulation of a received data symbol. A terminal or User Equipment (UE) may perform channel measurement through a CRS, thereby making a cell reselection decision and switching to a taget cell. Channel quality measurement is performed while the UE is connected. When there is a high level of interference, physical-layer disconnection may be implemented through relevant higher-layer radio link failure signaling. In LTE R10, to further increase cell average spectrum utilization, cell edge spectrum utilization, and UE throughput, two reference signals are defined respective, namely, a Channel State Information-Reference Signal (CSI-RS) and a DeModulation Reference Signal (DMRS). The CSI-RS is used for channel measurement. A Precoding Matrix Indicator (PMI), a Channel Quality Indicator (CQI) and a Rank Indicator (RI) to be fed by a UE back to an eNB may be computed through CSI-RS measurement. The DMRS is used for downlink shared channel demodulation. Demodulation with the DMRS not only may reduce interference between different receiving sides and between different cells by way of a beam, but also may reduce performance degradation caused by codebook granularity, as well as reducing downlink control signaling overhead to some extent, as no PMI bit overhead has to be added in a Physical Downlink Control Channel (PDCCH).

In LTE R8, R9 and R10, a PDCCH mainly may be distributed over first 1, 2, or 3 Orthogonal Frequency Division Multiplexing (OFDM) symbols of a subframe. A specific distribution is to be configured in accordance with a subframe type and a CRS port number, as shown in Table 1.

TABLE 1

| subframe | number of OFDM symbols for PDCCH with $N_{RB}^{DL} > 10$ | number of OFDM symbols for PDCCH with $N_{RB}^{DL} \leq 10$ |
| --- | --- | --- |
| subframe 1 and subframe 6 in subframe type 2 | 1, 2 | 2 |
| MBSFN subframe on a PDSCH supporting carrier, with a CRS port number of 1 or 2 | 1, 2 | 2 |
| MBSFN subframe on a PDSCH supporting carrier, with a CRS port number of 4 | 2 | 2 |
| subframe on a carrier supporting no PDSCH transfer | 0 | 0 |
| PRS non-MBSFN subframe (other than subframe 6 of frame structure type 2) | 1, 2, 3 | 2, 3 |
| subframe of any other situation | 1, 2, 3 | 2, 3, 4 |

A receiving side has to perform blind detection over the first three symbols. A starting position of the blind detection and a control channel element number may depend on a Radio Network Temporary Identitfier allocated to the receiving side as well as control information. In general the control information may include public control information and dedicated control information. The public control information is in general placed in a common search space of a PDCCH. The dedicated control may be placed in a common space and a dedicated search space. After blind detection, a receiving side may determine whether there is any common system message, downlink scheduling information, or uplink scheduling information in a subframe. As such downlink control information has no Hybrid Automatic Repeat Request (HARQ) feedback, a symbol error rate in detection as low as possible has to be ensured.

in an LTE R10 heterogeneous network, there is strong mutual interference between eNBs of different types. Given interference of a Macro eNodeB to a Pico and interference of a Home eNodeB to a Macro eNodeB, it is proposed to handle mutual interference between eNBs of different types by resource muting, specifically based on a subframe such as an Almost Blank Subframe (ABS), or based on a resource element, such as by CRS muting.

the muting method not only adds to resource waste, but also greatly limit scheduling. In particular, given ABS configuration of a Macro eNodeB, more Picos and more ABSs configured for the Macro eNodeB will bring greater impact on the Macro eNodeB, adding to resource waste as well as increasing a scheduling delay. Although interference among control channel data resources may be reduce with a control channel in an ABS, interference between a CRS resource and a data resource cannot be solved. The CRS muting fails to handle interference among data resources, and leads to poor backward compatibility, adding to an access delay and standardization effort.

In LTE R11, more users may be introduced to perform sending on a Multicast Broadcast Single Frequency Network (MBSFN) subframe, which may result in insufficient PDCCH capacity of 2 OFDM symbols configured for the MBSFN. To ensure backward compatibility with an R8/R9/R10 user, a new control information transmission resource (ePDCCH for short hereinafter) has to be created with a Physical Downlink Shared Channel (PDSCH) resource. With COMP introduced in R11, it is possible to handle interference between cells of different types by space division, save resource overhead, avoid resource waste caused by muting, and reduce the limit on scheduling. However, such a solution by space division cannot be implemented with a time-domain PDCCH at present. Such a time-domain PDCCH has to be kept for backward compatibility with R8 and R9. In this case, in order to handle interference between control channels by space division, a new control channel, namely, an Enhanced PDCCH (ePDCCH) has to be introduced. With the ePDCCH, good space division may be implemented, reducing physical downlink control signaling interference between different nodes and increasing system PDCCH capacity.

Also discussed in R11 is Physical Hybird ARQ Indicator Channel (PHICH) resource insufficiency. In R11, more uplink users has to be supported. In particular, in scene 4, a number of supportable uplink users increases significantly, PHICH capacity is limited greatly. In addition, R11 discussion supports different UEs to have identical uplink time-frequency resources/cyclic displacement allocation/CSHopping allocation/different Reference Signal (RS) sequences. Thus, conventional PHICH detecting resource allocation no longer applies, and further PHICH enhancement is required. Thus, further study on PHICH enhancement is necessary. Such an enhanced PHICH may be referred to as an Enhanced Physical Hybird ARQ Indicator Channel (ePH-ICH).

Also discussed in an R11 conference at present is whether common search space control signaling enhancement is required, which mainly depends on whether an R10 common search space at present has limited capacity and how severe is interference between different nodes, in particular Macro (Macro cell)-Pico (Pico cell) interference. With limited capacity or severe interference, it is necessary to introduce an enhanced common search space. As interference avoidance at a time-frequency resource position may be performed in a PDSCH area, a focus at present is an enhanced common search space based on a PDSCH area, referred to as an Enhanced Common Search Space (eCSS).

In discussion of the latest seventieth 3GPP conference, a preliminary conclusion is formed as follows.

An ePDCCH detecting cluster may consist of N Physical Resource Block (PRB) pairs.

The N may be 1 (N=1, localized ePDCCH transmission mode), 2, 4, 8, 16 (distributed ePDCCH transmission mode).

In the distributed ePDCCH transmission mode, an ePDCCH performs transmission using N PRB pairs in an ePDCCH detecting cluster.

In the localized ePDCCH transmission mode, transmission is performed in an ePDCCH detecting cluster. Further discussion is required to decide whether to support transmission on more than one PRB pair in the localized ePDCCH transmission mode.

K ePDCCH clusters (K≥1) may be configured by UE dedicated higher-layer signaling.

A maximal value of K may be 2, 3, 4 or 6.

An N may be configured for each of the K clusters.

A total number of blind detections for each of the K clusters is independent.

A total number of blind detections for a UE should be allocated to the K clusters.

An ePDCCH detecting cluster is configured to be in either the localized ePDCCH transmission mode or the distributed ePDCCH transmission mode.

PRB pairs of two logic ePDCCH detecting clusters may coincide with each other or partly overlap with each other, or have no overlap at all.

SUMMARY

In view of this, it is desired that embodiments of the disclosure provides a configuring and detecting method and device for an enhanced downlink control channel, an evolved Node B (eNB), and a User Equipment (UE), capable of providing R11 ePDCCH detecting cluster configuring information and flexibly configuring an ePDCCH detecting parameter. The ePDCCH detecting cluster may include one or more frequency domain resource units for ePDCCH detection allocated in an ePDCCH detecting subframe.

To this end, a technical solution herein may be implemented as follows.

A configuring method for an enhanced downlink control channel may include: configuring, for a User Equipment (UE), K Enhanced PDCCH (ePDCCH) detecting clusters; and independently configuring an antenna port indicator of a DeModulation Reference Signal (DMRS) in detection with an ePDCCH detecting cluster or any ePDCCH detecting cluster with a transmission mode in the K ePDCCH detecting clusters;

and/or independently configuring a scrambling sequence or a scrambling sequence indicator of a DMRS in detection with an ePDCCH detecting cluster or any ePDCCH detecting cluster with a transmission mode in the K ePDCCH detecting clusters;

and/or independently configuring correspondence between a scrambling sequence of a DMRS in detection with an ePDCCH detecting cluster or any ePDCCH detecting cluster with a transmission mode in the K ePDCCH detecting clusters and a scrambling sequence of a DMRS of a Physical Downlink Shared Channel (PDSCH);

and/or independently configuring a Common Reference Signal (CRS) rate matching resource in detection with an ePDCCH detecting cluster or any ePDCCH detecting cluster with a transmission mode in the K ePDCCH detecting clusters;

and/or independently configuring a resource element available for ePDCCH transmission in detection with an ePDCCH detecting cluster or any ePDCCH detecting cluster with a transmission mode in the K ePDCCH detecting clusters;

and/or independently configuring a starting symbol position for ePDCCH detection in detection with an ePDCCH detecting cluster or any ePDCCH detecting cluster with a transmission mode in the K ePDCCH detecting clusters;

and/or independently configuring a Channel State Information (CSI) measuring process configuration in detection with an ePDCCH detecting cluster or any ePDCCH detecting cluster with a transmission mode in the K ePDCCH detecting clusters; and/or independently configuring a Non-Zero Power (NZP) CSI-RS configuration in detection with an ePDCCH detecting cluster or any ePDCCH detecting cluster with a transmission mode in the K ePDCCH detecting clusters;

and/or independently configuring a Downlink Control Information (DCI) Format or a DCI Format set in detection with an ePDCCH detecting cluster or any ePDCCH detecting cluster with a transmission mode in the K ePDCCH detecting clusters;

and/or independently configuring an ePDCCH detecting subframe cluster in detection with an ePDCCH detecting cluster or any ePDCCH detecting cluster with a transmission mode in the K ePDCCH detecting clusters;

and/or independently configuring at least one of an aggregation level, a search space starting position, and a search space position in detection with an ePDCCH detecting cluster or any ePDCCH detecting cluster with a transmission mode in the K ePDCCH detecting clusters;

and/or independently predefining or independently configuring a default parametric value or a default behavior of an ePDCCH detecting cluster or any ePDCCH detecting cluster with a transmission mode in the K ePDCCH detecting clusters when the parameter or behavior is not indicated or acquired;

and/or configuring two or more ePDCCH detecting subframe clusters, each with an ePDCCH detecting cluster configuration and/or with ePDCCH detection or PDCCH detection. The ePDCCH detecting cluster configuration may include at least one of a number of detecting clusters, an aggregation level to be detected in a detecting cluster, and a resource position to be detected in the detecting cluster.

An antenna port of the DMRS in detection with an ePDCCH detecting cluster or any ePDCCH detecting cluster with a transmission mode in the K ePDCCH detecting clusters may be at least one of ports 107, 108, 109, and 110.

When two or more antenna ports of the DMRS in detection with an ePDCCH detecting cluster or any ePDCCH detecting cluster with a transmission mode in the K ePDCCH detecting clusters are configured, one of the two or more antenna ports of the DMRS may be determined as a detecting port according to one or more of an enhanced control Channel unit eCCE, a Cell Radio Network Temporary Identitfier (C-RNTI), and a predefined rule.

The independently configuring correspondence between a scrambling sequence of a DMRS in detection with an ePDCCH detecting cluster or any ePDCCH detecting cluster with a transmission mode in the K ePDCCH detecting clusters and a scrambling sequence of a DMRS of a PDSCH may include: when the DMRS of the PDSCH is configured with a scrambling sequence identifier, independently configuring correspondence between the scrambling sequence of the DMRS in detection with an ePDCCH detecting cluster in the K ePDCCH detecting clusters and the scrambling sequence of the DMRS of the PDSCH.

The CRS rate matching resource in detection with an ePDCCH detecting cluster or any ePDCCH detecting cluster with a transmission mode in the K ePDCCH detecting clusters may include at least one of a CRS port number, a CRS frequency domain position, and a CRS cell Identitfier.

The resource element available for ePDCCH in detection with an ePDCCH detecting cluster or any ePDCCH detecting cluster with a transmission mode in the K ePDCCH detecting clusters may include at least one of the CRS rate matching resource, a Zero Power (ZP) CSI-RS rate matching resource, an ePDCCH starting symbol, a special subframe configuration, and a cyclic prefix (CP) length configuration.

An ePDCCH starting symbol ID set in detection with an ePDCCH detecting cluster or any ePDCCH detecting cluster with a transmission mode in the K ePDCCH detecting clusters may include at least one of a set {0, 1, 2, 3, 4} or a set consisting of one or more ePDCCH starting symbol IDs obtained by Physical Control Format Indicator Channel (PCFICH) detection.

The independently configuring a CSI measuring process configuration in detection with an ePDCCH detecting cluster or any ePDCCH detecting cluster with a transmission mode in the K ePDCCH detecting clusters may include:

in configuring a CSI Process for the UE, adopting information relevant to a configured CSI measuring process as large-scale information required in detection with an ePDCCH detecting cluster or any ePDCCH detecting cluster with a transmission mode in the K ePDCCH detecting clusters.

The large-scale information may include at least one of a delay expansion corresponding to the CSI measuring process, a path delay corresponding to the CSI measuring process, a Doppler shift corresponding to the CSI measuring process, a Doppler expansion corresponding to the CSI measuring process, and an average received power corresponding to the CSI measuring process.

The CSI measuring process may include one of a measuring resource of the CSI measuring process, a measuring resource configured for: a CSI measuring subframe cluster and the CSI measuring process, and an NZP CSI-RS measuring resource.

The independently configuring an NZP CSI-RS configuration in detection with an ePDCCH detecting cluster or any ePDCCH detecting cluster with a transmission mode in the K ePDCCH detecting clusters may include:

in configuring a measuring set for the UE, adopting information relevant to a NZP CSI-RS in a configured measuring set as large-scale information required in detection with an ePDCCH detecting cluster or any ePDCCH detecting cluster with a transmission mode in the K ePDCCH detecting clusters.

The large-scale information may include at least one of a delay expansion corresponding to the NZP CSI-RS, a path delay corresponding to the NZP CSI-RS, a Doppler shift corresponding to the NZP CSI-RS, a Doppler expansion corresponding to the NZP CSI-RS, and an average received power corresponding to the NZP CSI-RS.

The independently configuring a DCI Format or a DCI Format set in detection with an ePDCCH detecting cluster or any ePDCCH detecting cluster with a transmission mode in the K ePDCCH detecting clusters may include:

independently configuring the DCI Format or the DCI Format set the UE is to detect in an ePDCCH detecting cluster or any ePDCCH detecting cluster with a transmission mode in the K ePDCCH detecting clusters.

The independently configuring an ePDCCH detecting subframe cluster in detection with an ePDCCH detecting cluster or any ePDCCH detecting cluster with a transmission mode in the K ePDCCH detecting clusters may include:

independently configuring, for an ePDCCH detecting cluster or any ePDCCH detecting cluster with a transmission mode in the K ePDCCH detecting clusters, an ePDCCH detecting subframe cluster, informing the UE of a subframe where to detect an ePDCCH and a subframe where to detect a PDCCH, or instructing the UE to use different ePDCCH detecting cluster configurations in different subframe clusters.

The independently configuring an ePDCCH detecting subframe cluster in detection with an ePDCCH detecting cluster or any ePDCCH detecting cluster with a transmission mode in the K ePDCCH detecting clusters may include:

independently configuring, for an ePDCCH detecting cluster or any ePDCCH detecting cluster with a transmission mode in the K ePDCCH detecting clusters, an ePDCCH detecting subframe cluster, informing the UE of a subframe where to detect an ePDCCH dedicated search space and a subframe where to detect a PDCCH dedicated search space.

The method may further include:

independently configuring, for an ePDCCH detecting cluster or any ePDCCH detecting cluster with a transmission mode in the K ePDCCH detecting clusters, PUCCH dynamic resource position indicator signaling in HARQ feedback, instructing the UE to use independently configured PUCCH dynamic resource position indicator signaling in downlink data HARQ feedback indicated in an ePDCCH.

The transmission mode may include a localized transmission mode and a distributed transmission mode.

The independently configuring a DCI Format or a DCI Format set in detection with an ePDCCH detecting cluster or any ePDCCH detecting cluster with a transmission mode in the K ePDCCH detecting clusters may include:

configuring a DCI Format set for a K;

configuring a DCI Format set for K ePDCCH detecting clusters, any ePDCCH detecting cluster with the distributed transmission mode, or any ePDCCH detecting cluster with the localized transmission mode; and configuring a DCI Format set for detection with an ePDCCH detecting cluster.

A method for detecting an enhanced downlink control channel may include:

detecting, by a User Equipment (UE), an enhanced downlink control channel; and obtaining an antenna port indicator of a DeModulation Reference Signal (DMRS) in detection with an Enhanced PDCCH (ePDCCH) detecting cluster or any ePDCCH detecting cluster with a transmission mode in K ePDCCH detecting clusters;

and/or obtaining a scrambling sequence indicator of a DMRS in detection with an ePDCCH detecting cluster or any ePDCCH detecting cluster with a transmission mode in the K ePDCCH detecting clusters;

and/or obtaining correspondence between a scrambling sequence of a DMRS in detection with an ePDCCH detecting cluster or any ePDCCH detecting cluster with a transmission mode in the K ePDCCH detecting clusters and a scrambling sequence of a DMRS of a Physical Downlink Shared Channel (PDSCH);

and/or obtaining a Common Reference Signal (CRS) rate matching resource in detection with an ePDCCH detecting cluster or any ePDCCH detecting cluster with a transmission mode in the K ePDCCH detecting clusters;

and/or obtaining a resource element available for ePDCCH transmission in detection with an ePDCCH detecting cluster or any ePDCCH detecting cluster with a transmission mode in the K ePDCCH detecting clusters;

and/or obtaining an ePDCCH starting symbol ID set in detection with an ePDCCH detecting cluster or any ePDCCH detecting cluster with a transmission mode in the K ePDCCH detecting clusters;

and/or obtaining a Channel State Information (CSI) measuring process configuration in detection with an ePDCCH detecting cluster or any ePDCCH detecting cluster with a transmission mode in the K ePDCCH detecting clusters;

and/or obtaining a Non-Zero Power (NZP) CSI-RS configuration in detection with an ePDCCH detecting cluster or any ePDCCH detecting cluster with a transmission mode in the K ePDCCH detecting clusterss;

and/or obtaining a Downlink Control Information (DCI) Format or a DCI Format set in detection with an ePDCCH detecting cluster or any ePDCCH detecting cluster with a transmission mode in the K ePDCCH detecting clusters;

and/or obtaining an ePDCCH detecting subframe cluster in detection with an ePDCCH detecting cluster or any ePDCCH detecting cluster with a transmission mode in the K ePDCCH detecting clusters;

and/or obtaining an aggregation level and a search space starting position in detection with an ePDCCH detecting cluster or any ePDCCH detecting cluster with a transmission mode in the K ePDCCH detecting clusters;

and/or independently predefining or independently configuring a default parametric value or a default behavior of an ePDCCH detecting cluster or any ePDCCH detecting cluster with a transmission mode in the K ePDCCH detecting clusters when the parameter or behavior is not acquired;

and/or when two or more ePDCCH detecting subframe clusters are obtained, for different ePDCCH detecting subframe clusters, performing detection with different ePDCCH detecting cluster configurations and/or adopting ePDCCH detection or PDCCH detection. An ePDCCH detecting cluster configuration may include at least one of a number of detecting clusters, an aggregation level to be detected in a detecting cluster, and a resource position to be detected in the detecting cluster.

An antenna port of the DMRS in detection with an ePDCCH detecting cluster or any ePDCCH detecting cluster with a transmission mode in the K ePDCCH detecting clusters may be at least one of ports 107, 108, 109, and 110.

The correspondence between a scrambling sequence of a DMRS in detection with an ePDCCH detecting cluster or any ePDCCH detecting cluster with a transmission mode in the K ePDCCH detecting clusters and a scrambling sequence of a DMRS of a PDSCH may be independently configured by: when the DMRS of the PDSCH is configured with a scrambling sequence identifier, independently configuring correspondence between the scrambling sequence of the DMRS in detection with an ePDCCH detecting cluster in the K ePDCCH detecting clusters and the scrambling sequence of the DMRS of the PDSCH.

The CRS rate matching resource in detection with an ePDCCH detecting cluster or any ePDCCH detecting cluster with a transmission mode in the K ePDCCH detecting clusters may include at least one of a CRS port number, a CRS frequency domain position, and a CRS cell Identitfier.

The resource element available for ePDCCH in detection with an ePDCCH detecting cluster or any ePDCCH detecting cluster with a transmission mode in the K ePDCCH detecting clusters may include at least one of the CRS rate matching resource, a Zero Power (ZP) CSI-RS rate matching resource, an ePDCCH starting symbol, a special subframe configuration, and a cyclic prefix (CP) length configuration.

The ePDCCH starting symbol ID set in detection with an ePDCCH detecting cluster or any ePDCCH detecting cluster with a transmission mode in the K ePDCCH detecting clusters may include at least one of: a set $\{0, 1, 2, 3, 4\}$ or a set consisting of one or more ePDCCH starting symbol IDs obtained by Physical Control Format Indicator Channel (PCFICH) detection.

The CSI measuring process configuration in detection with an ePDCCH detecting cluster or any ePDCCH detecting cluster with a transmission mode in the K ePDCCH detecting clusters may be independently configured by: in configuring a CSI measuring process for the UE, adopting information relevant to the configured CSI measuring process as large-scale information required in detection with an ePDCCH detecting cluster or any ePDCCH detecting cluster with a transmission mode in the K ePDCCH detecting clusters. The large-scale information may include at least one of a delay expansion corresponding to the CSI measuring process, a path delay corresponding to the CSI measuring process, a Doppler shift corresponding to the CSI measuring process, a Doppler expansion corresponding to the CSI measuring process, and an average received power corresponding to the CSI measuring process. The CSI measuring process may include one of a measuring resource of the CSI measuring process, a measuring resource configured for: a CSI measuring subframe cluster and the CSI measuring process, and an NZP CSI-RS measuring resource;

The NZP CSI-RS configuration in detection with an ePDCCH detecting cluster or any ePDCCH detecting cluster with a transmission mode in the K ePDCCH detecting clusters may be independently configured by: in configuring a measuring set for the UE, adopting information relevant to a NZP CSI-RS in a configured measuring set as large-scale information required in detection with an ePDCCH detecting cluster or any ePDCCH detecting cluster with a transmission mode in the K ePDCCH detecting clusters.

The DCI Format or the DCI Format set in detection with an ePDCCH detecting cluster or any ePDCCH detecting cluster with a transmission mode in the K ePDCCH detecting clusters may be independently configured by: independently configuring the DCI Format or the DCI Format set the UE is to detect in an ePDCCH detecting cluster or any ePDCCH detecting cluster with a transmission mode in the K ePDCCH detecting clusters.

The ePDCCH detecting subframe cluster in detection with an ePDCCH detecting cluster or any ePDCCH detecting cluster with a transmission mode in the K ePDCCH detecting clusters may be independently configured by: independently configuring, for an ePDCCH detecting cluster or any ePDCCH detecting cluster with a transmission mode in the K ePDCCH detecting clusters, an ePDCCH detecting subframe cluster, informing the UE of a subframe where to detect an ePDCCH and a subframe where to detect a PDCCH, or instructing the UE to use different ePDCCH detecting cluster configurations in different subframe clusters. The ePDCCH detecting subframe cluster in detection with an ePDCCH detecting cluster or any ePDCCH detecting cluster with a transmission mode in the K ePDCCH detecting clusters may also be independently configured by: independently configuring, for an ePDCCH detecting cluster or any ePDCCH detecting cluster with a transmission mode in the K ePDCCH detecting clusters, an ePDCCH detecting subframe cluster, informing the UE of a subframe where to detect an ePDCCH dedicated search space and a subframe where to detect a PDCCH dedicated search space.

PUCCH dynamic resource position indicator signaling in HARQ feedback may be independently configured for: an ePDCCH detecting cluster or any ePDCCH detecting cluster with a transmission mode in the K ePDCCH detecting clusters to instruct the UE to use independently configured PUCCH dynamic resource position indicator signaling in downlink data HARQ feedback indicated in an ePDCCH.

When two or more antenna ports of the DMRS in detection with an ePDCCH detecting cluster or any ePDCCH detecting cluster with a transmission mode in the K ePDCCH detecting clusters are obtained, one of the two or more antenna ports of the DMRS may be determined as a detecting port according to one or more of an enhanced control Channel unit eCCE, a Cell Radio Network Temporary Identitfier (C-RNTI), and a predefined rule.

The transmission mode may include a localized transmission mode and a distributed transmission mode.

According to the DCI Format or the DCI Format set in detection with an ePDCCH detecting cluster or any ePDCCH detecting cluster with a transmission mode in the K ePDCCH detecting clusters obtained, the UE may perform detection using a DCI Format set for a K;

the UE may perform detection using a DCI Format set for K ePDCCH detecting clusters, any ePDCCH detecting cluster with the distributed transmission mode, or any ePDCCH detecting cluster with the localized transmission mode; and the UE may perform detection using a DCI Format set for detection with an ePDCCH detecting cluster.

A configuring device for an enhanced downlink control channel may include a first configuring unit and a second configuring unit.

The first configuring unit may be configured for: configuring, for a User Equipment (UE), K Enhanced PDCCH (ePDCCH) detecting clusters.

The second configuring unit may be configured for: independently configuring an antenna port indicator of a DeModulation Reference Signal (DMRS) in detection with an ePDCCH detecting cluster or any ePDCCH detecting cluster with a transmission mode in the K ePDCCH detecting clusters;

and/or independently configuring a scrambling sequence or a scrambling sequence indicator of a DMRS in detection with an ePDCCH detecting cluster or any ePDCCH detecting cluster with a transmission mode in the K ePDCCH detecting clusters;

and/or independently configuring correspondence between a scrambling sequence of a DMRS in detection with an ePDCCH detecting cluster or any ePDCCH detecting cluster with a transmission mode in the K ePDCCH detecting clusters and a scrambling sequence of a DMRS of a Physical Downlink Shared Channel (PDSCH);

and/or independently configuring a Common Reference Signal (CRS) rate matching resource in detection with an ePDCCH detecting cluster or any ePDCCH detecting cluster with a transmission mode in the K ePDCCH detecting clusters;

and/or independently configuring a resource element available for ePDCCH transmission in detection with an ePDCCH detecting cluster or any ePDCCH detecting cluster with a transmission mode in the K ePDCCH detecting clusters;

and/or independently configuring a starting symbol position for ePDCCH detection in detection with an ePDCCH detecting cluster or any ePDCCH detecting cluster with a transmission mode in the K ePDCCH detecting clusters;

and/or independently configuring a Channel State Information (CSI) measuring process configuration in detection with an ePDCCH detecting cluster or any ePDCCH detecting cluster with a transmission mode in the K ePDCCH detecting clusters;

and/or independently configuring a Non-Zero Power (NZP) CSI-RS configuration in detection with an ePDCCH detecting cluster or any ePDCCH detecting cluster with a transmission mode in the K ePDCCH detecting clusters;

and/or independently configuring a Downlink Control Information (DCI) Format or a DCI Format set in detection with an ePDCCH detecting cluster or any ePDCCH detecting cluster with a transmission mode in the K ePDCCH detecting clusters;

and/or independently configuring an ePDCCH detecting subframe cluster in detection with an ePDCCH detecting cluster or any ePDCCH detecting cluster with a transmission mode in the K ePDCCH detecting clusters;

and/or independently configuring at least one of an aggregation level, a search space starting position, and a search space position in detection with an ePDCCH detecting cluster or any ePDCCH detecting cluster with a transmission mode in the K ePDCCH detecting clusters;

and/or independently predefining or independently configuring a default parametric value or a default behavior of an ePDCCH detecting cluster or any ePDCCH detecting cluster with a transmission mode in the K ePDCCH detecting clusters when the parameter or behavior is not indicated or acquired;

and/or configuring two or more ePDCCH detecting subframe clusters, each with an ePDCCH detecting cluster configuration and/or with ePDCCH detection or PDCCH detection. The ePDCCH detecting cluster configuration may include at least one of a number of detecting clusters, an aggregation level to be detected in a detecting cluster, and a resource position to be detected in the detecting cluster.

An antenna port of the DMRS in detection with an ePDCCH detecting cluster or any ePDCCH detecting cluster with a transmission mode in the K ePDCCH detecting clusters may be at least one of ports 107, 108, 109, and 110.

The independently configuring correspondence between a scrambling sequence of a DMRS in detection with an ePDCCH detecting cluster or any ePDCCH detecting cluster with a transmission mode in the K ePDCCH detecting clusters and a scrambling sequence of a DMRS of a PDSCH may include: when the DMRS of the PDSCH is configured with a scrambling sequence identifier, independently configuring correspondence between the scrambling sequence of the DMRS in detection with an ePDCCH detecting cluster in the K ePDCCH detecting clusters and the scrambling sequence of the DMRS of the PDSCH.

The CRS rate matching resource in detection with an ePDCCH detecting cluster or any ePDCCH detecting cluster with a transmission mode in the K ePDCCH detecting clusters may include at least one of a CRS port number, a CRS frequency domain position, and a CRS cell Identitfier.

The resource element available for ePDCCH in detection with an ePDCCH detecting cluster or any ePDCCH detecting cluster with a transmission mode in the K ePDCCH detecting clusters may include at least one of the CRS rate matching resource, a Zero Power (ZP) CSI-RS rate matching resource, an ePDCCH starting symbol, a special subframe configuration, and a cyclic prefix (CP) length configuration.

An ePDCCH starting symbol ID set in detection with an ePDCCH detecting cluster or any ePDCCH detecting cluster with a transmission mode in the K ePDCCH detecting clusters may include at least one of: a set {0, 1, 2, 3, 4} or a set consisting of one or more ePDCCH starting symbol IDs obtained by Physical Control Format Indicator Channel (PCFICH) detection.

The independently configuring a CSI measuring process configuration in detection with an ePDCCH detecting cluster or any ePDCCH detecting cluster with a transmission mode in the K ePDCCH detecting clusters may include: in configuring a CSI measuring process for the UE, adopting information relevant to the configured CSI measuring process as large-scale information required in detection with an ePDCCH detecting cluster or any ePDCCH detecting cluster with a transmission mode in the K ePDCCH detecting clusters. The large-scale information may include at least one of a delay expansion corresponding to the CSI measuring process, a path delay corresponding to the CSI measuring process, a Doppler shift corresponding to the CSI measuring process, a Doppler expansion corresponding to the CSI measuring process, and an average received power corresponding to the CSI measuring process. The CSI measuring process may include one of a measuring resource of the CSI measuring process, a measuring resource configured for: a CSI measuring subframe cluster and the CSI measuring process, and an NZP CSI-RS measuring resource.

The independently configuring an NZP CSI-RS configuration in detection with an ePDCCH detecting cluster or any ePDCCH detecting cluster with a transmission mode in the K ePDCCH detecting clusters may include: in configuring a measuring set for the UE, adopting information relevant to a NZP CSI-RS in a configured measuring set as large-scale information required in detection with an ePDCCH detecting cluster or any ePDCCH detecting cluster with a transmission mode in the K ePDCCH detecting clusters.

The independently configuring a DCI Format or a DCI Format set in detection with an ePDCCH detecting cluster or any ePDCCH detecting cluster with a transmission mode in the K ePDCCH detecting clusters may include: independently configuring the DCI Format or the DCI Format set the UE is to detect in an ePDCCH detecting cluster or any ePDCCH detecting cluster with a transmission mode in the K ePDCCH detecting clusters.

The independently configuring an ePDCCH detecting subframe cluster in detection with an ePDCCH detecting cluster or any ePDCCH detecting cluster with a transmission mode in the K ePDCCH detecting clusters may include: independently configuring, for an ePDCCH detecting cluster or any ePDCCH detecting cluster with a transmission mode in the K ePDCCH detecting clusters, an ePDCCH detecting subframe cluster, informing the UE of a subframe where to detect an ePDCCH and a subframe where to detect a PDCCH, or instructing the UE to use different ePDCCH detecting cluster configurations in different subframe clusters. The independently configuring an ePDCCH detecting subframe cluster in detection with an ePDCCH detecting cluster or any ePDCCH detecting cluster with a transmission mode in the K ePDCCH detecting clusters may include: independently configuring, for an ePDCCH detecting cluster or any ePDCCH detecting cluster with a transmission mode in the K ePDCCH detecting clusters, an ePDCCH detecting subframe cluster, informing the UE of a subframe where to detect an ePDCCH dedicated search space and a subframe where to detect a PDCCH dedicated search space.

PUCCH dynamic resource position indicator signaling in HARQ feedback may be independently configured for: an ePDCCH detecting cluster or any ePDCCH detecting cluster with a transmission mode in the K ePDCCH detecting clusters to instruct the UE to use independently configured PUCCH dynamic resource position indicator signaling in downlink data HARQ feedback indicated in an ePDCCH.

The device may further include:
a determining unit configured for: when two or more antenna ports of the DMRS in detection with an ePDCCH detecting cluster or any ePDCCH detecting cluster with a transmission mode in the K ePDCCH detecting clusters are configured, determining one of the two or more antenna ports of the DMRS as a detecting port according to one or more of an enhanced control Channel unit eCCE, a Cell Radio Network Temporary identifier (C-RNTI), and a predefined rule.

The transmission mode may include a localized transmission mode and a distributed transmission mode.

The second configuring unit may be further configured for:
configuring a DCI Format set for a K;
configuring a DCI Format set for K ePDCCH detecting clusters, any ePDCCH detecting cluster with the distributed transmission mode, or any ePDCCH detecting cluster with the localized transmission mode; and
configuring a DCI Format set for detection with an ePDCCH detecting cluster.

An eNodeB (eNB) may include the aforementioned configuring device.

A device for detecting an enhanced downlink control channel may include a detecting unit and an obtaining unit.

The detecting unit may be configured for: detecting an enhanced downlink control channel.

The obtaining unit may be configured for: obtaining an antenna port indicator of a DeModulation Reference Signal (DMRS) in detection with an Enhanced PDCCH (ePDCCH) detecting cluster or any ePDCCH detecting cluster with a transmission mode in K ePDCCH detecting clusters;

and/or obtaining a scrambling sequence indicator of a DMRS in detection with an ePDCCH detecting cluster or any ePDCCH detecting cluster with a transmission mode in the K ePDCCH detecting clusters;

and/or obtaining correspondence between a scrambling sequence of a DMRS in detection with an ePDCCH detecting cluster or any ePDCCH detecting cluster with a transmission mode in the K ePDCCH detecting clusters and a scrambling sequence of a DMRS of a Physical Downlink Shared Channel (PDSCH);

and/or obtaining a Common Reference Signal (CRS) rate matching resource in detection with an ePDCCH detecting cluster or any ePDCCH detecting cluster with a transmission mode in the K ePDCCH detecting clusters;

and/or obtaining a resource element available for ePDCCH transmission in detection with an ePDCCH detecting cluster or any ePDCCH detecting cluster with a transmission mode in the K ePDCCH detecting clusters;

and/or obtaining an ePDCCH starting symbol ID set in detection with an ePDCCH detecting cluster or any ePDCCH detecting cluster with a transmission mode in the K ePDCCH detecting clusters;

and/or obtaining a Channel State Information (CSI) measuring process configuration in detection with an ePDCCH detecting cluster or any ePDCCH detecting cluster with a transmission mode in the K ePDCCH detecting clusters;

and/or obtaining a Non-Zero Power (NZP) CSI-RS configuration in detection with an ePDCCH detecting cluster or any ePDCCH detecting cluster with a transmission mode in the K ePDCCH detecting clusterss;

and/or obtaining a Downlink Control Information (DCI) Format or a DCI Format set in detection with an ePDCCH detecting cluster or any ePDCCH detecting cluster with a transmission mode in the K ePDCCH detecting clusters;

and/or obtaining an ePDCCH detecting subframe cluster in detection with an ePDCCH detecting cluster or any ePDCCH detecting cluster with a transmission mode in the K ePDCCH detecting clusters;

and/or obtaining an aggregation level and a search space starting position in detection with an ePDCCH detecting cluster or any ePDCCH detecting cluster with a transmission mode in the K ePDCCH detecting clusters;

and/or independently predefining or independently configuring a default parametric value or a default behavior of an ePDCCH detecting cluster or any ePDCCH detecting cluster with a transmission mode in the K ePDCCH detecting clusters when the parameter or behavior is not acquired;

and/or when two or more ePDCCH detecting subframe clusters are obtained, for different ePDCCH detecting subframe clusters, performing detection with different ePDCCH detecting cluster configurations and/or adopting ePDCCH detection or PDCCH detection. An ePDCCH detecting cluster configuration may include at least one of a number of detecting clusters, an aggregation level to be detected in a detecting cluster, and a resource position to be detected in the detecting cluster.

An antenna port of the DMRS in detection with an ePDCCH detecting cluster or any ePDCCH detecting cluster with a transmission mode in the K ePDCCH detecting clusters may be at least one of ports 107, 108, 109, and 110.

The correspondence between a scrambling sequence of a DMRS in detection with an ePDCCH detecting cluster or any ePDCCH detecting cluster with a transmission mode in the K ePDCCH detecting clusters and a scrambling sequence of a DMRS of a PDSCH may be independently configured by: when the DMRS of the PDSCH is configured with a scrambling sequence identifier, independently configuring correspondence between the scrambling sequence of the DMRS in detection with an ePDCCH detecting cluster in the K ePDCCH detecting clusters and the scrambling sequence of the DMRS of the PDSCH.

The CRS rate matching resource in detection with an ePDCCH detecting cluster or any ePDCCH detecting cluster with a transmission mode in the K ePDCCH detecting clusters may include at least one of a CRS port number, a CRS frequency domain position, and a CRS cell Identitfier.

The resource element available for ePDCCH in detection with an ePDCCH detecting cluster or any ePDCCH detecting cluster with a transmission mode in the K ePDCCH detecting clusters may include at least one of the CRS rate matching resource, a Zero Power (ZP) CSI-RS rate matching resource, an ePDCCH starting symbol, a special subframe configuration, and a cyclic prefix (CP) length configuration.

The ePDCCH starting symbol ID set in detection with an ePDCCH detecting cluster or any ePDCCH detecting cluster with a transmission mode in the K ePDCCH detecting clusters may include at least one of: a set {0, 1, 2, 3, 4} or a set consisting of one or more ePDCCH starting symbol IDs obtained by Physical Control Format Indicator Channel (PCFICH) detection.

The CSI measuring process configuration in detection with an ePDCCH detecting cluster or any ePDCCH detecting cluster with a transmission mode in the K ePDCCH detecting clusters may be independently configured by: in configuring a CSI measuring process for the UE, adopting information relevant to the configured CSI measuring process as large-scale information required in detection with an ePDCCH detecting cluster or any ePDCCH detecting cluster with a transmission mode in the K ePDCCH detecting clusters. The large-scale information may include at least one of a delay expansion corresponding to the CSI measuring process, a path delay corresponding to the CSI measuring process, a Doppler shift corresponding to the CSI measuring process, a Doppler expansion corresponding to the CSI measuring process, and an average received power corresponding to the CSI measuring process. The CSI measuring process may include one of a measuring resource of the CSI measuring process, a measuring resource configured for: a CSI measuring subframe cluster and the CSI measuring process, and an NZP CSI-RS measuring resource.

The NZP CSI-RS configuration in detection with an ePDCCH detecting cluster or any ePDCCH detecting cluster with a transmission mode in the K ePDCCH detecting clusters may be independently configured by: in configuring a measuring set for the UE, adopting information relevant to a NZP CSI-RS in a configured measuring set as large-scale information required in detection with an ePDCCH detecting cluster or any ePDCCH detecting cluster with a transmission mode in the K ePDCCH detecting clusters.

The DCI Format or the DCI Format set in detection with an ePDCCH detecting cluster or any ePDCCH detecting cluster with a transmission mode in the K ePDCCH detecting clusters may be independently configured by: independently configuring the DCI Format or the DCI Format set the UE is to detect in an ePDCCH detecting cluster or any ePDCCH detecting cluster with a transmission mode in the K ePDCCH detecting clusters.

The ePDCCH detecting subframe cluster in detection with an ePDCCH detecting cluster or any ePDCCH detecting cluster with a transmission mode in the K ePDCCH detecting clusters may be independently configured by: independently configuring, for an ePDCCH detecting cluster or any ePDCCH detecting cluster with a transmission mode in the K ePDCCH detecting clusters, an ePDCCH detecting subframe cluster, informing the UE of a subframe where to detect an ePDCCH and a subframe where to detect a PDCCH, or instructing the UE to use different ePDCCH detecting cluster configurations in different subframe clusters. The ePDCCH detecting subframe cluster in detection with an ePDCCH detecting cluster or any ePDCCH detecting cluster with a transmission mode in the K ePDCCH detecting clusters may also be independently configured by:

independently configuring, for an ePDCCH detecting cluster or any ePDCCH detecting cluster with a transmission mode in the K ePDCCH detecting clusters, an ePDCCH detecting subframe cluster, informing the UE of a subframe where to detect an ePDCCH dedicated search space and a subframe where to detect a PDCCH dedicated search space.

PUCCH dynamic resource position indicator signaling in HARQ feedback may be independently configured for: an ePDCCH detecting cluster or any ePDCCH detecting cluster with a transmission mode in the K ePDCCH detecting clusters to instruct the UE to use independently configured PUCCH dynamic resource position indicator signaling in downlink data HARQ feedback indicated in an ePDCCH.

The device may further include:

a determining unit configured for: when two or more antenna ports of the DMRS in detection with an ePDCCH detecting cluster or any ePDCCH detecting cluster with a transmission mode in the K ePDCCH detecting clusters are obtained by the obtaining unit, determining one of the two or more antenna ports of the DMRS as a detecting port according to one or more of an enhanced control Channel unit eCCE, a Cell Radio Network Temporary Identitfier (C-RNTI), and a predefined rule.

The transmission mode may include a localized transmission mode and a distributed transmission mode.

The detecting unit may be further configured for: performing detection using a DCI Format set for a K;

performing detection using a DCI Format set for K ePDCCH detecting clusters, any ePDCCH detecting cluster with the distributed transmission mode, or any ePDCCH detecting cluster with the localized transmission mode; and performing detection using a DCI Format set for detection with an ePDCCH detecting cluster.

A User Equipment (UE) may include the device for detecting an enhanced downlink control channel.

An eNodeB (eNB) may be configured for: notifying, using User Equipment (UE) dedicated higher-layer signaling and/or Downlink Control Information (DCI), a UE whether to assume in Enhanced PDCCH (ePDCCH) resource detection that a time-frequency resource sharing DeModulation Reference Signal (DMRS) antenna port is used for ePDCCH transmission or Physical Downlink Shared Channel (PDSCH) transmission by another UE.

The eNB may be further configured for: configuring K ePDCCH detecting clusters, and independently configuring whether the UE assumes in ePDCCH resource detection in the K ePDCCH detecting clusters that a time-frequency resource sharing DMRS antenna port is used for ePDCCH transmission or PDSCH transmission by another UE.

The eNB may be further configured for: configuring K ePDCCH detecting clusters, and configuring whether the UE assumes in ePDCCH resource detection in part or all of the K ePDCCH detecting clusters that a time-frequency resource sharing DMRS antenna port is used for ePDCCH transmission or PDSCH transmission by another UE.

The eNB may be further configured for: configuring X subframe clusters, and configuring whether the UE assumes in ePDCCH resource detection in part or all of the X subframe clusters that a time-frequency resource sharing DMRS antenna port is used for ePDCCH transmission or PDSCH transmission by another UE.

The DMRS antenna port may include at least one of ports 107, 108, 109, and 110, wherein ports 107 and 108 share a time-frequency resource, and ports 109 and 110 share a time-frequency resource.

A User Equipment (UE) may be configured for: learning, by receiving User Equipment (UE) dedicated higher-layer signaling and/or Downlink Control Information (DCI), whether to assume in Enhanced PDCCH (ePDCCH) resource detection that a time-frequency resource sharing DeModulation Reference Signal (DMRS) antenna port is used for ePDCCH transmission or Physical Downlink Shared Channel (PDSCH) transmission by another UE.

The UE may be further configured for: obtaining, by receiving higher-layer signaling, K ePDCCH detecting clusters configured; receiving independently configured channel estimation higher-layer signaling that signals the UE whether to assume in ePDCCH resource detection in the K ePDCCH detecting clusters that a time-frequency resource sharing DMRS antenna port is used for ePDCCH transmission or PDSCH transmission by another UE; and performing, according to the received higher-layer signaling, DMRS channel estimation.

The UE may be further configured for: obtaining, through UE dedicated higher-layer signaling, K ePDCCH detecting clusters configured; and learning whether the UE is configured to assume in ePDCCH resource detection in part or all of the K ePDCCH detecting clusters that a time-frequency resource sharing DMRS antenna port is used for ePDCCH transmission or PDSCH transmission by another UE.

The UE may be further configured for: obtaining, through UE dedicated higher-layer signaling, X subframe clusters configured; and learning whether the UE is configured to assume in ePDCCH resource detection in part or all of the X subframe clusters that a time-frequency resource sharing DMRS antenna port is used for ePDCCH transmission or PDSCH transmission by another UE.

The DMRS antenna port is configured for ePDCCH demodulation and may include at least one of ports 107, 108, 109, and 110, wherein ports 107 and 108 share a time-frequency resource, and ports 109 and 110 share a time-frequency resource.

A User Equipment (UE) may be configured for: always assuming in Enhanced PDCCH (ePDCCH) resource detection that a time-frequency resource sharing DeModulation Reference Signal (DMRS) antenna port is not used for ePDCCH transmission or Physical Downlink Shared Channel (PDSCH) transmission by another UE.

The DMRS antenna port may be configured for ePDCCH demodulation and may include at least one of ports 107, 108, 109, and 110. Ports 107 and 108 may share a time-frequency resource. Ports 109 and 110 may share a time-frequency resource.

A User Equipment (UE) may be configured for: determining, according to an Enhanced PDCCH (ePDCCH) transmission mode, whether to assume in ePDCCH resource detection that a time-frequency resource sharing DeModulation Reference Signal (DMRS) antenna port is used for ePDCCH transmission or Physical Downlink Shared Channel (PDSCH) transmission by another UE.

The UE may be configured for: with a localized transmission mode, always assuming in ePDCCH resource detection that a time-frequency resource sharing DMRS antenna port is not used for ePDCCH transmission or PDSCH transmission by another UE.

The UE may be configured for: with a distributed transmission mode, assuming in ePDCCH resource detection that a time-frequency resource sharing DMRS antenna port is used for ePDCCH transmission or PDSCH transmission by another UE.

The DMRS antenna port may be configured for ePDCCH demodulation and may include at least one of ports 107, 108, 109, and 110. Ports 107 and 108 may share a time-frequency resource. Ports 109 and 110 may share a time-frequency resource.

With the disclosure, K Enhanced PDCCH (ePDCCH) detecting clusters may be configured for a UE; a DMRS antenna port indicator in detection with an ePDCCH detecting cluster or any ePDCCH detecting cluster with a transmission mode in the K ePDCCH detecting clusters may be independently configured; or a DMRS scrambling sequence indicator in detection with an ePDCCH detecting cluster or any ePDCCH detecting cluster with a transmission mode in the K ePDCCH detecting clusters may be independently configured.

Or, correspondence between a DMRS scrambling sequence in detection with an ePDCCH detecting cluster or any ePDCCH detecting cluster with a transmission mode in the K ePDCCH detecting clusters and a PDSCH DMRS scrambling sequence may be independently configured. A CRS rate matching resource in detection with an ePDCCH detecting cluster or any ePDCCH detecting cluster with a transmission mode in the K ePDCCH detecting clusters may be independently configured. An ePDCCH usable resource element in detection with an ePDCCH detecting cluster or any ePDCCH detecting cluster with a transmission mode in the K ePDCCH detecting clusters may be independently configured. An ePDCCH starting symbol position in detection with an ePDCCH detecting cluster or any ePDCCH detecting cluster with a transmission mode in the K ePDCCH detecting clusters may be independently configured. A CSI measuring process configuration in detection with an ePDCCH detecting cluster or any ePDCCH detecting cluster with a transmission mode in the K ePDCCH detecting clusters may be independently configured. An NZP CSI-RS configuration in detection with an ePDCCH detecting cluster or any ePDCCH detecting cluster with a transmission mode in the K ePDCCH detecting clusters may be independently configured. A DCI Format in detection with an ePDCCH detecting cluster or any ePDCCH detecting cluster with a transmission mode in the K ePDCCH detecting clusters may be independently configured. An ePDCCH detecting subframe cluster in detection with an ePDCCH detecting cluster or any ePDCCH detecting cluster with a transmission mode in the K ePDCCH detecting clusters may be independently configured. An aggregation level and a search space starting position in detection with an ePDCCH detecting cluster or any ePDCCH detecting cluster with a transmission mode in the K ePDCCH detecting clusters may be independently configured. A default value or a default behavior of an ePDCCH detecting cluster or any ePDCCH detecting cluster with a transmission mode in the K ePDCCH detecting clusters may be predefined or configured independently. A UE side may perform ePDCCH detection and obtain the configuration information, and implement ePDCCH parsing. With a technical solution herein, an eNB side may flexibly configure, for a UE, an ePDCCH detecting parameter, thereby achieving flexible dynamic ePDCCH switch between multiple TPs, more flexible ePDCCH scheduling information configuration by the eNB side, and improved ePDCCH stability.

DETAILED DESCRIPTION

Figure 1:
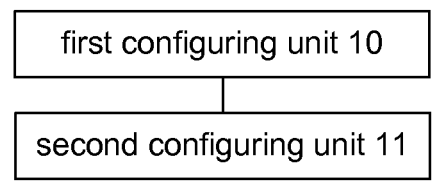
FIG. 1 is a schematic diagram of a structure of a configuring device for an enhanced downlink control channel according to an embodiment herein.

To clearly show a technical problem to be solved, a technical solution, and beneficial effects of the present disclosure, the present disclosure is further elaborated below with reference to the drawings and embodiments.

To facilitate understanding, the disclosure is further illustrated below with embodiments. By independent configuration herein, irrelevance between different ePDCCH sets is stressed, without limiting that no configuration can be performed within a same set of signaling or that there can be no association to common PDSCH configuring signaling. Embodiments may be combined freely with each other. Separate drafting of embodiments poses no limitation to a form of combination.

Embodiment 1

An eNB may configure, through UE higher-layer signaling, $K(K \geq 1)$ ePDCCH detecting clusters for a UE. In addition, the eNB may independently configure, through UE dedicated higher-layer signaling, a DMRS antenna port indicator in detection with an ePDCCH detecting cluster or any ePDCCH detecting cluster with a certain transmission mode. The UE may perform ePDCCH reception and detection by receiving the K ePDCCH detecting clusters configured by the eNB and a DMRS antenna port independently configured.

Sub-Embodiment 1 of Embodiment 1

For example, 2 ePDCCH detecting clusters (K=2), namely, ePDCCH detecting cluster 0 and ePDCCH detecting cluster 1, may be configured.

ePDCCH detecting cluster 0 may be for detection with DMRS port 7.

ePDCCH detecting cluster 1 may be for detection with DMRS port 8.

Sub-Embodiment 2 of Embodiment 1

For example, 2 ePDCCH detecting clusters (K=2), namely, ePDCCH detecting cluster 0 and ePDCCH detecting cluster 1, may be configured.

ePDCCH detecting cluster 0 may be for detection with DMRS ports 7, 8.

ePDCCH detecting cluster 1 may be for detection with DMRS ports 9, 10.

Sub-Embodiment 3 of Embodiment 1

For example, 4 ePDCCH detecting clusters may be configured, that is, K=4. ePDCCH detecting clusters 0 and 1 may be in the localized ePDCCH transmission mode. ePDCCH detecting clusters 2 and 3 may be in the distributed ePDCCH transmission mode.

The distributed ePDCCH transmission mode may correspond to detection with DMRS port 7.

The localized ePDCCH transmission mode may correspond to detection with DMRS port 8.

Sub-Embodiment 4 of Embodiment 1

For example, 4 ePDCCH detecting clusters may be configured, that is, K=4. ePDCCH detecting clusters 0 and 1 may be in the localized ePDCCH transmission mode. ePDCCH detecting clusters 2 and 3 may be in the distributed ePDCCH transmission mode.

The distributed ePDCCH transmission mode may correspond to detection with DMRS ports 7, 8.

The localized ePDCCH transmission mode may correspond to detection with DMRS ports 9, 10.

A specific port adopted by the UE in DMRS detection will depend on an eCCE indicator and/or a C-RNTI and/or a PRB indicator.

Embodiment 2

An eNB may configure, through UE higher-layer signaling, K(K≥1) ePDCCH detecting clusters for a UE. In addition, the eNB may independently configure, through UE dedicated higher-layer signaling, a DMRS scrambling sequence in detection with an ePDCCH detecting cluster or any ePDCCH detecting cluster with a certain transmission mode. The UE may perform ePDCCH reception and detection by receiving the K ePDCCH detecting clusters configured by the eNB and the DMRS scrambling sequence independently configured.

Sub-Embodiment 1 of Embodiment 2

For example, 2 ePDCCH detecting clusters (K=2), namely, ePDCCH detecting cluster 0 and ePDCCH detecting cluster 1, may be configured.

ePDCCH detecting cluster 0 may be for DMRS scrambling sequence detection with virtual cell ID X0 and Nscid=0.

ePDCCH detecting cluster 1 may be for DMRS scrambling sequence detection with virtual cell ID X1 and Nscid=0.

$$c_{init}=(\lfloor n_s/2 \rfloor+1) \cdot (2n_{ID}^{EPDCCH}+1) \cdot 2^{16}+n_{SCID}^{EPDCCH}.$$

Xn (n=1, 2) denotes $n_{ID}^{EPDCCH}$, and Nscid denotes $n_{SCID}^{EPDCCH}$.

Sub-Embodiment 2 of Embodiment 2

For example, 2 ePDCCH detecting clusters (K=2), namely, ePDCCH detecting cluster 0 and ePDCCH detecting cluster 1, may be configured.

ePDCCH detecting cluster 0 may be for DMRS scrambling sequence detection with virtual cell ID X0 and Nscid=0.

ePDCCH detecting cluster 1 may be for DMRS scrambling sequence detection with virtual cell ID X1 and Nscid=1.

$$c_{init}=(\lfloor n_s/2 \rfloor+1) \cdot (2n_{ID}^{EPDCCH}+1) \cdot 2^{16}+n_{SCID}^{EPDCCH}.$$

Xn (n=1, 2) denotes $n_{ID}^{EPDCCH}$, and Nscid denotes $n_{SCID}^{EPDCCH}$.

Nscid may be fixed as Nscid=0 or Nscid=1; or both Nsicd and virtual ID may be independently configured in accordance with higher-layer signaling.

Sub-Embodiment 3 of Embodiment 2

For example, 4 ePDCCH detecting clusters may be configured, that is, K=4. ePDCCH detecting clusters 0 and 1 may be in the localized ePDCCH transmission mode. ePDCCH detecting clusters 2 and 3 may be in the distributed ePDCCH transmission mode.

The distributed ePDCCH transmission mode may correspond to DMRS scrambling sequence detection with virtual cell ID X0 and Nscid=0.

The localized ePDCCH transmission mode may correspond to DMRS scrambling sequence detection with virtual cell ID X1 and Nscid=0.

$$c_{init}=(\lfloor n_s/2 \rfloor+1) \cdot (2n_{ID}^{EPDCCH}+1) \cdot 2^{16}+n_{SCID}^{EPDCCH}.$$

Xn (n=1, 2) denotes $n_{ID}^{EPDCCH}$ and Nscid denotes $n_{SCID}^{EPDCCH}$.

Sub-Embodiment 4 of Embodiment 2

For example, 4 ePDCCH detecting clusters may be configured, that is, K=4. ePDCCH detecting clusters 0 and 1 may be in the localized ePDCCH transmission mode. ePDCCH detecting clusters 2 and 3 may be in the distributed ePDCCH transmission mode.

The distributed ePDCCH transmission mode may correspond to DMRS scrambling sequence detection with virtual cell ID X0 and Nscid=0.

The localized ePDCCH transmission mode may correspond to DMRS scrambling sequence detection with virtual cell ID X1 and Nscid=1.

$$c_{init}=(\lfloor n_s/2 \rfloor+1) \cdot (2n_{ID}^{EPDCCH}+1) \cdot 2^{16}+n_{SCID}^{EPDCCH}.$$

Xn (n=1, 2) denotes $n_{ID}^{EPDCCH}$, and Nscid denotes $n_{SCID}^{EPDCCH}$.

Nscid may be fixed as Nscid=0 or Nscid=1; or both Nsicd and virtual ID may be independently configured in accordance with higher-layer signaling.

Embodiment 3

An eNB may configure, through UE higher-layer signaling, K(K≥1) ePDCCH detecting clusters for a UE. In addition, the eNB may independently configure, through UE dedicated higher-layer signaling, correspondence between a DMRS scrambling sequence in detection with an ePDCCH detecting cluster or any ePDCCH detecting cluster with a certain transmission mode and a PDSCH DMRS scrambling sequence. The UE may perform ePDCCH reception and detection by receiving the K ePDCCH detecting clusters configured by the eNB and the correspondence between the DMRS scrambling sequence and the PDSCH DMRS scrambling sequence independently configured.

Sub-Embodiment 1 of Embodiment 3

For example, 2 ePDCCH detecting clusters (K=2), namely, ePDCCH detecting cluster 0 and ePDCCH detecting cluster 1, may be configured. PDSCH DMRS scrambling sequences {X0, Nscid=0} and {X1, Nscid=1} may be configured.

ePDCCH detecting cluster 0 may be for DMRS scrambling sequence detection with X0 and Nscid=0.

ePDCCH detecting cluster 1 may be for DMRS scrambling sequence detection with X1 and Nscid=1.

A binding relation may be indicated through 1-bit higher-layer signaling. For example, bit value 0 may bind X0 and Nscid=0, and bit value 1 may bind X1 and Nscid 10=1.

$$c_{init}=(\lfloor n_s/2 \rfloor+1) \cdot (2n_{ID}^{EPDCCH}+1) \cdot 2^{16}+n_{SCID}^{EPDCCH}.$$

Xn (n=1, 2) denotes $n_{ID}^{EPDCCH}$, and Nscid denotes $n_{SCID}^{EPDCCH}$.

Sub-Embodiment 2 of Embodiment 3

For example, 2 ePDCCH detecting clusters (K=2), namely, ePDCCH detecting cluster 0 and ePDCCH detecting cluster 1, may be configured. PDSCH DMRS scrambling sequences {X0, Nscid=0} and {X1, Nscid=1} may be configured.

ePDCCH detecting cluster 0 may be for DMRS scrambling sequence detection with X0 and Nscid=0.

ePDCCH detecting cluster 1 may be for DMRS scrambling sequence detection with X1 and Nscid=0.

A binding relation to a PDSCH DMRS sequence may be indicated through 1-bit higher-layer signaling. For example, bit value 0 may bind X0, and bit value 1 may bind X1, with Nscid fixed at 0 or 1.

$$c_{init}=(\lfloor n_s/2 \rfloor+1)\cdot(2n_{ID}^{EPDCCH}+1)\cdot 2^{16}+n_{SCID}^{EPDCCH}.$$

Xn (n=1, 2) denotes $n_{ID}^{EPDCCH}$, and Nscid denotes $n_{SCID}^{EPDCCH}$.

Sub-Embodiment 3 of Embodiment 3

For example, 4 ePDCCH detecting clusters may be configured, that is, K=4. ePDCCH detecting clusters 0 and 1 may be in the localized ePDCCH transmission mode. ePDCCH detecting clusters 2 and 3 may be in the distributed ePDCCH transmission mode. PDSCH DMRS scrambling sequences {X0, Nscid=0} and {X1, Nscid=1} may be configured.

The distributed ePDCCH transmission mode may correspond to DMRS scrambling sequence detection with X0 and Nscid=0.

The localized ePDCCH transmission mode may correspond to DMRS scrambling sequence detection with X1 and Nscid=1.

A binding relation may be indicated through 1-bit higher-layer signaling. For example, bit value 0 may bind X0 and Nscid=0, and bit value 1 may bind X1 and Nscid=1.

$$c_{init}=(\lfloor n_s/2 \rfloor+1)\cdot(2n_{ID}^{EPDCCH}+1)\cdot 2^{16}+n_{SCID}^{EPDCCH}.$$

Xn (n=1, 2) denotes $n_{ID}^{EPDCCH}$ and Nscid denotes $n_{SCID}^{EPDCCH}$.

Sub-Embodiment 4 of Embodiment 3

For example, 4 ePDCCH detecting clusters may be configured, that is, K=4. ePDCCH detecting clusters 0 and 1 may be in the localized ePDCCH transmission mode. ePDCCH detecting clusters 2 and 3 may be in the distributed ePDCCH transmission mode. PDSCH DMRS scrambling sequences {X0, Nscid=0} and {X1, Nscid=1} may be configured.

The distributed ePDCCH transmission mode may correspond to DMRS scrambling sequence detection with X0 and Nscid=0.

The localized ePDCCH transmission mode may correspond to DMRS scrambling sequence detection with X1 and Nscid=0.

A binding relation to a PDSCH DMRS sequence may be indicated through 1-bit higher-layer signaling. For example, bit value 0 may bind X0, and bit value 1 may bind X1, with Nscid fixed at 0 or 1.

$$c_{init}=(\lfloor n_s/2 \rfloor+1)\cdot(2n_{ID}^{EPDCCH}+1)\cdot 2^{16}+n_{SCID}^{EPDCCH}.$$

Xn (n=1, 2) denotes $n_{ID}^{EPDCCH}$, and Nscid denotes $n_{SCID}^{EPDCCH}$.

Embodiment 4

An eNB may configure, through UE higher-layer signaling, K(K≥1) ePDCCH detecting clusters for a UE. In addition, the eNB may independently configure, through UE dedicated higher-layer signaling, a CRS rate matching resource in detection with an ePDCCH detecting cluster. The UE may perform ePDCCH reception and detection by receiving the K ePDCCH detecting clusters configured by the eNB and an independently configured CRS rate matching resource.

Sub-Embodiment 1 of Embodiment 4

For example, 2 ePDCCH detecting clusters (K=2), namely, ePDCCH detecting cluster 0 and ePDCCH detecting cluster 1, may be configured.

ePDCCH detecting cluster 0 may be for detection with CRS rate matching resource S0.

ePDCCH detecting cluster 1 may be for detection with CRS rate matching resource S1.

Sub-Embodiment 2 of Embodiment 4

For example, 2 ePDCCH detecting clusters (K=2), namely, ePDCCH detecting cluster 0 and ePDCCH detecting cluster 1, may be configured. PDSCH CRS rate matching resources S0 and S1 may be configured.

ePDCCH detecting cluster 0 may be for detection with CRS rate matching resource S0.

ePDCCH detecting cluster 1 may be for detection with CRS rate matching resource S1.

A binding relation to a PDSCH CRS rate matching resource may be indicated through 1-bit higher-layer signaling. For example, bit value 0 may bind S0, and bit value 1 may bind S1.

Sub-Embodiment 3 of Embodiment 4

For example, 4 ePDCCH detecting clusters may be configured, that is, K=4. ePDCCH detecting clusters 0 and 1 may be in the localized ePDCCH transmission mode. ePDCCH detecting clusters 2 and 3 may be in the distributed ePDCCH transmission mode.

The distributed ePDCCH transmission mode may correspond to detection with CRS rate matching resource S0.

The localized ePDCCH transmission mode may correspond to detection with CRS rate matching resource S1.

Sub-Embodiment 4 of Embodiment 4

For example, 4 ePDCCH detecting clusters may be configured, that is, K=4. ePDCCH detecting clusters 0 and 1 may be in the localized ePDCCH transmission mode. ePDCCH detecting clusters 2 and 3 may be in the distributed ePDCCH transmission mode. PDSCH CRS rate matching resources S0 and S1 may be configured.

The distributed ePDCCH transmission mode may correspond to detection with CRS rate matching resource S0.

The localized ePDCCH transmission mode may correspond to detection with CRS rate matching resource S1.

A binding relation to a PDSCH CRS rate matching resource may be indicated through 1-bit higher-layer signaling. For example, bit value 0 may bind S0, and bit value 1 may bind S1.

Embodiment 5

An eNB may configure, through UE higher-layer signaling, K(K≥1) ePDCCH detecting clusters for a UE. In addition, the eNB may independently configure, through UE dedicated higher-layer signaling, an ePDCCH usable resource element (resource element available for ePDCCH transmission) in detection with an ePDCCH detecting cluster. The UE may perform ePDCCH reception and detection by receiving the K ePDCCH detecting clusters configured by the eNB and the ePDCCH usable resource element independently configured.

The ePDCCH usable resource element may include at least one of a CRS rate matching resource, an ZP CSI-RS rate matching resource, an ePDCCH starting symbol, a special subframe configuration, and a CP length configuration.

Sub-Embodiment 1 of Embodiment 5

For example, 2 ePDCCH detecting clusters (K=2), namely, ePDCCH detecting cluster 0 and ePDCCH detecting cluster 1, may be configured.

ePDCCH detecting cluster 0 may be for detection with usable resource element S0.

ePDCCH detecting cluster 1 may be for detection with usable resource element S1.

Sub-Embodiment 2 of Embodiment 5

For example, 2 ePDCCH detecting clusters (K=2), namely, ePDCCH detecting cluster 0 and ePDCCH detecting cluster 1, may be configured. PDSCH usable resource elements S0 and S1 may be configured.

ePDCCH detecting cluster 0 may be for detection with usable resource element S0.

ePDCCH detecting cluster 1 may be for detection with usable resource element S1.

A binding relation to a PDSCH usable resource element may be indicated through 1-bit higher-layer signaling. For example, bit value 0 may bind S0, and bit value 1 may bind S1.

Sub-Embodiment 3 of Embodiment 5

For example, 4 ePDCCH detecting clusters may be configured, that is, K=4. ePDCCH detecting clusters 0 and 1 may be in the localized ePDCCH transmission mode. ePDCCH detecting clusters 2 and 3 may be in the distributed ePDCCH transmission mode.

The distributed ePDCCH transmission mode may correspond to detection with usable resource element S0.

The localized ePDCCH transmission mode may correspond to detection with usable resource element S1.

Sub-Embodiment 4 of Embodiment 5

For example, 4 ePDCCH detecting clusters may be configured, that is, K=4. ePDCCH detecting clusters 0 and 1 may be in the localized ePDCCH transmission mode. ePDCCH detecting clusters 2 and 3 may be in the distributed ePDCCH transmission mode. PDSCH usable resource elements S0 and S1 may be configured.

The distributed ePDCCH transmission mode may correspond to detection with usable resource element S0.

The localized ePDCCH transmission mode may correspond to detection with usable resource element S1.

A binding relation to a PDSCH usable resource element may be indicated through 1-bit higher-layer signaling. For example, bit value 0 may bind S0, and bit value 1 may bind S1.

Embodiment 6

An eNB may configure, through UE higher-layer signaling, K(K≥1) ePDCCH detecting clusters for a UE. In addition, the eNB may independently configure, through UE dedicated higher-layer signaling, an ePDCCH starting symbol ID in detection with an ePDCCH detecting cluster. The UE may perform ePDCCH reception and detection by receiving the K ePDCCH detecting clusters configured by the eNB and the independently configured ePDCCH starting symbol ID.

the ePDCCH starting symbol ID in detection with an ePDCCH detecting cluster may include at least one of 0, 1, 2, 3, 4, and an ePDCCH starting symbol ID obtained by Physical Control Format Indicator Channel (PCFICH) detection.

Sub-Embodiment 1 of Embodiment 6

For example, 2 ePDCCH detecting clusters (K=2), namely, ePDCCH detecting cluster 0 and ePDCCH detecting cluster 1, may be configured.

ePDCCH detecting cluster 0 may be for detection with an ePDCCH starting symbol ID 1.

ePDCCH detecting cluster 1 may be for detection with an ePDCCH starting symbol ID 2.

Sub-Embodiment 2 of Embodiment 6

For example, 2 ePDCCH detecting clusters (K=2), namely, ePDCCH detecting cluster 0 and ePDCCH detecting cluster 1, may be configured. PDSCH starting position symbol IDs 1 and 2 may be configured.

ePDCCH detecting cluster 0 may be for detection with the starting position symbol ID 1.

ePDCCH detecting cluster 1 may be for detection with the starting position symbol ID 2.

A binding relation to a PDSCH starting position symbol ID may be indicated through 1-bit higher-layer signaling. For example, bit value 0 may bind 1, and bit value 1 may bind 2.

Sub-Embodiment 3 of Embodiment 6

For example, 4 ePDCCH detecting clusters may be configured, that is, K=4. ePDCCH detecting clusters 0 and 1 may be in the localized ePDCCH transmission mode. ePDCCH detecting clusters 2 and 3 may be in the distributed ePDCCH transmission mode.

The distributed ePDCCH transmission mode may correspond to detection with an ePDCCH starting symbol ID 1.

The localized ePDCCH transmission mode may correspond to detection with an ePDCCH starting symbol ID 2.

Sub-Embodiment 4 of Embodiment 6

For example, 4 ePDCCH detecting clusters may be configured, that is, K=4. ePDCCH detecting clusters 0 and 1 may be in the localized ePDCCH transmission mode. ePDCCH detecting clusters 2 and 3 may be in the distributed ePDCCH transmission mode. PDSCH starting position symbol IDs 1 and 2 may be configured.

The distributed ePDCCH transmission mode may correspond to detection with the starting position symbol ID 1.

The localized ePDCCH transmission mode may correspond to detection with the starting position symbol ID 2.

A binding relation to a PDSCH starting position symbol ID may be indicated through 1-bit higher-layer signaling. For example, bit value 0 may bind 1, and bit value 1 may bind 2.

Embodiment 7

An eNB may configure, through UE higher-layer signaling, K(K≥1) ePDCCH detecting clusters for a UE. In addition, the eNB may independently configure, through UE dedicated higher-layer signaling, a CSI measuring process configuration in detection with an ePDCCH detecting cluster. The UE may perform ePDCCH reception and detection by receiving the K ePDCCH detecting clusters configured by the eNB and the independently configured CSI measuring process configuration.

Sub-Embodiment 1 of Embodiment 7

For example, 2 ePDCCH detecting clusters (K=2), namely, ePDCCH detecting cluster 0 and ePDCCH detecting cluster 1, may be configured. CSI Processes 0, 1 may be configured for the UE.

ePDCCH detecting cluster 0 may correspond to CSI Process 0.

ePDCCH detecting cluster 1 may correspond to CSI Process 0.

Sub-Embodiment 2 of Embodiment 7

For example, 2 ePDCCH detecting clusters (K=2), namely, ePDCCH detecting cluster 0 and ePDCCH detecting cluster 1, may be configured. PDSCH CSI Processes 0, 1 may be configured.

ePDCCH detecting cluster 0 may be for detection with PDSCH CSI Process 0.

ePDCCH detecting cluster 1 may be for detection with PDSCH CSI Process 1.

A binding relation to a PDSCH starting position symbol ID may be indicated through 1-bit higher-layer signaling. For example, bit value 0 may bind PDSCH CSI Process 0, and bit value 1 may bind PDSCH CSI Process 1.

Sub-Embodiment 3 of Embodiment 7

For example, 4 ePDCCH detecting clusters may be configured, that is, K=4. ePDCCH detecting clusters 0 and 1 may be in the localized ePDCCH transmission mode. ePDCCH detecting clusters 2 and 3 may be in the distributed ePDCCH transmission mode. CSI Processes 0, 1 may be configured for the UE.

The distributed ePDCCH transmission mode may correspond to CSI Process 0.

The localized ePDCCH transmission mode may correspond to CSI Process 0.

Sub-Embodiment 4 of Embodiment 7

For example, 4 ePDCCH detecting clusters may be configured, that is, K=4. ePDCCH detecting clusters 0 and 1 may be in the localized ePDCCH transmission mode. ePDCCH detecting clusters 2 and 3 may be in the distributed ePDCCH transmission mode. PDSCH CSI Processes 0, 1 may be configured.

The distributed ePDCCH transmission mode may correspond to detection with PDSCH CSI Process 0.

The localized ePDCCH transmission mode may correspond to detection with PDSCH CSI Process 1.

A binding relation to a PDSCH starting position symbol ID may be indicated through 1-bit higher-layer signaling. For example, bit value 0 may bind PDSCH CSI Process 0, and bit value 1 may bind PDSCH CSI Process 1.

Embodiment 8

An eNB may configure, through UE higher-layer signaling, K(K≥1) ePDCCH detecting clusters for a UE. In addition, the eNB may independently configure, through UE dedicated higher-layer signaling, an NZP CSI-RS configuration in detection with an ePDCCH detecting cluster. The UE may perform ePDCCH reception and detection by receiving the K ePDCCH detecting clusters configured by the eNB and the independently configured NZP CSI-RS configuration.

Sub-Embodiment 1 of Embodiment 8

For example, 2 ePDCCH detecting clusters (K=2), namely, ePDCCH detecting cluster 0 and ePDCCH detecting cluster 1, may be configured. NZP CSI-RS 0 and NZP CSI-RS 1 may be configured for the UE.

ePDCCH detecting cluster 0 may correspond to NZP CSI-RS 0.

ePDCCH detecting cluster 1 may correspond to NZP CSI-RS 1.

Sub-Embodiment 2 of Embodiment 8

For example, 2 ePDCCH detecting clusters (K=2), namely, ePDCCH detecting cluster 0 and ePDCCH detecting cluster 1, may be configured. PDSCH NZP CSI-RSs 0, 1 may be configured.

ePDCCH detecting cluster 0 may be for detection with PDSCH NZP CSI-RS 0.

ePDCCH detecting cluster 1 may be for detection with PDSCH NZP CSI-RS 1.

A binding relation to a PDSCH starting position symbol ID may be indicated through 1-bit higher-layer signaling. For example, bit value 0 may bind PDSCH NZP CSI-RS 0, and bit value 1 may bind PDSCH NZP CSI-RS 1.

Sub-Embodiment 3 of Embodiment 8

For example, 4 ePDCCH detecting clusters may be configured, that is, K=4. ePDCCH detecting clusters 0 and 1 may be in the localized ePDCCH transmission mode. ePDCCH detecting clusters 2 and 3 may be in the distributed ePDCCH transmission mode. NZP CSI-RS 0 and NZP CSI-RS 1 may be configured for the UE.

The distributed ePDCCH transmission mode may correspond to NZP CSI-RS 0.

The localized ePDCCH transmission mode may correspond to NZP CSI-RS 1.

Sub-Embodiment 4 of Embodiment 8

For example, 4 ePDCCH detecting clusters may be configured, that is, K=4. ePDCCH detecting clusters 0 and 1 may be in the localized ePDCCH transmission mode. ePDCCH detecting clusters 2 and 3 may be in the distributed ePDCCH transmission mode. PDSCH NZP CSI-RSs 0, 1 may be configured.

The distributed ePDCCH transmission mode may correspond to PDSCH NZP CSI-RS 0.

The localized ePDCCH transmission mode may correspond to PDSCH NZP CSI-RS 1.

A binding relation to a PDSCH starting position symbol ID may be indicated through 1-bit higher-layer signaling. For example, bit value 0 may bind PDSCH NZP CSI-RS 0, and bit value 1 may bind PDSCH NZP CSI-RS 1.

Embodiment 9

An eNB may configure, through UE higher-layer signaling, K(K≥1) ePDCCH detecting clusters for a UE. In addition, the eNB may independently configure, through UE dedicated higher-layer signaling, a DCI Format in detection with an ePDCCH detecting cluster. The UE may perform ePDCCH reception and detection by receiving the K ePDCCH detecting clusters configured by the eNB and an independently configured DCI Format detecting set. A DCI Format configured for an ePDCCH detecting cluster may be detected in the ePDCCH detecting cluster.

Sub-Embodiment 1 of Embodiment 9

For example, 2 ePDCCH detecting clusters (K=2), namely, ePDCCH detecting cluster 0 and ePDCCH detecting cluster 1, may be configured. DCI Format detecting sets 0, 1 may be configured for the UE.

ePDCCH detecting cluster 0 may correspond to DCI Format detecting set 0.

ePDCCH detecting cluster 1 may correspond to DCI Format detecting set 1.

Sub-Embodiment 2 of Embodiment 9

For example, 2 ePDCCH detecting clusters (K=2), namely, ePDCCH detecting cluster 0 and ePDCCH detecting cluster 1, may be configured. DCI Format detecting sets 0, 1 may be configured for the UE.

ePDCCH detecting cluster 0 may correspond to DCI Format detecting set 0.

ePDCCH detecting cluster 1 may correspond to DCI Format detecting set 1.

The DCI Format detecting set 0 may include DCI Formats 1A, 0.

The DCI Format detecting set 1 may include DCI Formats 2C, 4.

Sub-Embodiment 3 of Embodiment 9

For example, 4 ePDCCH detecting clusters may be configured, that is, K=4. ePDCCH detecting clusters 0 and 1 may be in the localized ePDCCH transmission mode. ePDCCH detecting clusters 2 and 3 may be in the distributed ePDCCH transmission mode. DCI Format detecting sets 0, 1 may be configured for the UE.

The distributed ePDCCH transmission mode may correspond to DCI Format detecting set 0.

The localized ePDCCH transmission mode may correspond to DCI Format detecting set 1.

Sub-Embodiment 4 of Embodiment 9

For example, 4 ePDCCH detecting clusters may be configured, that is, K=4. ePDCCH detecting clusters 0 and 1 may be in the localized ePDCCH transmission mode. ePDCCH detecting clusters 2 and 3 may be in the distributed ePDCCH transmission mode. DCI Format detecting sets 0, 1 may be configured for the UE.

The distributed ePDCCH transmission mode may correspond to DCI Format detecting set 0.

The localized ePDCCH transmission mode may correspond to DCI Format detecting set 1.

The DCI Format detecting set 0 may include DCI Formats 1A, 0.

The DCI Format detecting set 1 may include DCI Formats 2C, 4.

Embodiment 10

An eNB may configure, through UE higher-layer signaling, K(K≥1) ePDCCH detecting clusters for a UE. In addition, the eNB may independently configure, through UE dedicated higher-layer signaling, a detecting subframe cluster in detection with an ePDCCH detecting cluster. The UE may perform ePDCCH reception and detection by receiving the K ePDCCH detecting clusters configured by the eNB and the independently configured detecting subframe cluster. Detection may be performed in an ePDCCH detecting cluster according to a detecting subframe corresponding to the ePDCCH detecting cluster. The subframe cluster may inform the UE of a subframe for detection by ePDCCH and a subframe for detection by PDCCH, or instruct the UE to use different ePDCCH detecting cluster configurations in different subframe clusters.

Sub-Embodiment 1 of Embodiment 10

For example, 2 ePDCCH detecting clusters (K=2), namely, ePDCCH detecting cluster 0 and ePDCCH detecting cluster 1, may be configured. Detecting subframe clusters 0 and 1 may be configured for the UE.

ePDCCH detecting cluster 0 may be configured with detecting subframe cluster 0.

ePDCCH detecting cluster 1 may be configured with detecting subframe cluster 1.

Sub-Embodiment 2 of Embodiment 10

For example, 4 ePDCCH detecting clusters may be configured, that is, K=4. ePDCCH detecting clusters 0 and 1 may be in the localized ePDCCH transmission mode. ePDCCH detecting clusters 2 and 3 may be in the distributed ePDCCH transmission mode. Detecting subframe clusters 0 and 1 may be configured for the UE.

The distributed ePDCCH transmission mode may be configured with detecting subframe cluster 0.

The localized ePDCCH transmission mode may be configured with detecting subframe cluster 1.

Sub-Embodiment 3 of Embodiment 10

For example, four subframe clusters may be configured.

Subframe cluster 0 may be configured for supporting the UE to perform detection by PDCCH.

The UE may be informed to perform detection by ePDCCH with ePDCCH detecting clusters 0 and 1 in subframe cluster 1.

The UE may be informed to perform detection by ePDCCH with ePDCCH detecting clusters 1 and 2 in subframe cluster 2.

The UE may be informed to perform detection by ePDCCH with ePDCCH detecting cluster 3 in subframe cluster 3.

A detecting cluster parameter may be configured separately for the ePDCCH detecting clusters 0, 1, 2, 3. Such a parameter may include
an aggregation level to be detected in a detecting cluster.
a resource position to be detected in the detecting cluster.

Embodiment 11

An eNB may configure, through UE higher-layer signaling, K(K≥1) ePDCCH detecting clusters for a UE. In addition, the eNB may independently configure, through UE dedicated higher-layer signaling, a position of a PUCCH dynamic position offset indicator value in HARQ feedback in detection with an ePDCCH detecting cluster. The UE may receive the K ePDCCH detecting clusters configured by the eNB and the independently configured PUCCH dynamic position offset indicator value in HARQ feedback. HARQ feedback may be performed in the ePDCCH detecting cluster in accordance with the PUCCH dynamic position offset indicator value in HARQ feedback.

The PUCCH dynamic position offset indicator value in HARQ feedback may inform the UE of an uplink PUCCH dynamic resource position offset indicator value for ePDCCH ACK/NACK information feedback.

Sub-Embodiment 1 of Embodiment 11

For example, 2 ePDCCH detecting clusters (K=2), namely, ePDCCH detecting cluster 0 and ePDCCH detecting cluster 1, may be configured. PUCCH starting positions $\alpha_0$ and $\alpha_1$ in HARQ feedback may be configured for the UE.

ePDCCH detecting cluster 0 may correspond to PUCCH starting position $\alpha_0$ in HARQ feedback.

ePDCCH detecting cluster 1 may correspond to PUCCH starting position $\alpha_1$ in HARQ feedback.

For example, for an FDD system:

for PUCCH transmission with a single antenna port, $$n_{PUCCH}^{(1,\tilde{p})}=n_{CCE}+N_{PUCCH}^{(1)}+\alpha_n(n=0/1);$$

for PUCCH transmission with two antenna ports, $$n_{PUCCH}^{(1,\tilde{p})}=n_{CCE}+1+N_{PUCCH}^{(1)}+\alpha_n(n=0/1);$$

$n_{PUCCH}^{(1,\tilde{p})}$ denotes a resource position for actual HARQ transmission, $N_{PUCCH}^{(1)}$ denotes a PUCCH starting position in HARQ feedback, a denotes the dynamic position offset indicator value, and $n_{CCE}$ denotes a lowest eCCE indicator for DCI Format transmission.

Sub-Embodiment 2 of Embodiment 11

For example, 4 ePDCCH detecting clusters may be configured, that is, K=4. ePDCCH detecting clusters 0 and 1 may be in the localized ePDCCH transmission mode. ePDCCH detecting clusters 2 and 3 may be in the distributed ePDCCH transmission mode. PUCCH starting positions $\alpha_0$ and $\alpha_1$ in HARQ feedback may be configured for the UE.

The distributed ePDCCH transmission mode may correspond to PUCCH starting position $\alpha_0$ in HARQ feedback.

The localized ePDCCH transmission mode may correspond to PUCCH starting position $\alpha_1$ in HARQ feedback.

For example, for an FDD system:

for PUCCH transmission with a single antenna port, $$n_{PUCCH}^{(1,\tilde{p})}=n_{CCE}+N_{PUCCH}^{(1)}+\alpha_n(n=0/1);$$

for PUCCH transmission with two antenna ports, $$n_{PUCCH}^{(1,\tilde{p})}=n_{CCE}+1+N_{PUCCH}^{(1)}+\alpha_n(n=0/1);$$

$n_{PUCCH}^{(1,\tilde{p})}$ denotes a resource position for actual HARQ transmission, $N_{PUCCH}^{(1)}$ denotes a PUCCH starting position in HARQ feedback, a denotes the dynamic position offset indicator value, and $n_{CCE}$ denotes a lowest eCCE indicator for DCI Format transmission.

Embodiment 12

An eNB may configure, through UE higher-layer signaling, K(K≥1) ePDCCH detecting clusters for a UE. No DMRS scrambling sequence in detection with an ePDCCH detecting cluster or any ePDCCH detecting cluster with a certain transmission mode is independently configured by the eNB through UE dedicated higher-layer signaling. The UE may receive the K ePDCCH detecting clusters configured by the eNB.

Sub-Embodiment 1 of Embodiment 12

For example, 4 ePDCCH detecting clusters may be configured, that is, K=4. ePDCCH detecting clusters 0 and 1 may be in the distributed ePDCCH transmission mode. ePDCCH detecting clusters 2 and 3 may be in the localized ePDCCH transmission mode. It may be predefined that by default the distributed ePDCCH transmission mode corresponds to the PDSCH DMRS scrambling sequence X0 and Nscid=0. It may be predefined that by default the localized ePDCCH transmission mode corresponds to the PDSCH DMRS scrambling sequence X1 and Nscid=0.

$$c_{init}=(\lfloor n_s/2 \rfloor+1)\cdot(2n_{ID}^{EPDCCH}+1)\cdot 2^{16}+n_{SCID}^{EPDCCH},$$

with Xn (n=1, 2) denoting $n_{ID}^{EPDCCH}$, and Nscid denoting $n_{SCID}^{EPDCCH}$.

Sub-Embodiment 2 of Embodiment 12

For example, 2 ePDCCH detecting clusters (K=2), namely, ePDCCH detecting cluster 0 and ePDCCH detecting cluster 1, may be configured. It may be predefined that by default the ePDCCH detecting cluster 0 corresponds to the PDSCH DMRS scrambling sequence X0 and Nscid=0, and ePDCCH detecting cluster 1 corresponds to the PDSCH DMRS scrambling sequence X1 and Nscid=0.

$$c_{init}=(\lfloor n_s/2 \rfloor+1)\cdot(2n_{ID}^{EPDCCH}+1)\cdot 2^{16}+n_{SCID}^{EPDCCH},$$

with Xn (n=1, 2) denoting $n_{ID}^{EPDCCH}$, and Nscid denoting $n_{SCID}^{EPDCCH}$.

Embodiment 13

An eNB may configure, through UE higher-layer signaling, K(K≥1) ePDCCH detecting clusters for a UE. In addition, the eNB may independently configure, through UE dedicated higher-layer signaling, an aggregation level in detection with an ePDCCH detecting cluster or any ePDCCH detecting cluster with a certain transmission mode. The UE may perform ePDCCH detection by receiving the K ePDCCH detecting clusters configured by the eNB and aggregation levels independently configured.

Sub-Embodiment 1 of Embodiment 13

For example, 4 ePDCCH detecting clusters may be configured, that is, K=4. ePDCCH detecting clusters 0 and 1 may be in the distributed ePDCCH transmission mode. ePDCCH detecting clusters 2 and 3 may be in the localized ePDCCH transmission mode.

The distributed ePDCCH transmission mode may correspond to the aggregation level X0.

The localized ePDCCH transmission mode may correspond to the aggregation level X1.

Sub-Embodiment 2 of Embodiment 13

For example, 2 ePDCCH detecting clusters (K=2), namely, ePDCCH detecting cluster 0 and ePDCCH detecting cluster 1, may be configured.

ePDCCH detecting cluster 0 may correspond to the aggregation level X0.

ePDCCH detecting cluster 1 may correspond to the aggregation level X1.

Embodiment 14

An eNB may configure, through UE higher-layer signaling, K(K≥1) ePDCCH detecting clusters for a UE. In addition, the eNB may independently configure, through UE dedicated higher-layer signaling, a search space position or a search space starting position in detection with an ePDCCH detecting cluster or any ePDCCH detecting cluster with a certain transmission mode. The UE may receive the K ePDCCH detecting clusters configured by the eNB and one or more search space positions or search space starting positions independently configured.

Sub-Embodiment 1 of Embodiment 14

For example, 4 ePDCCH detecting clusters may be configured, that is, K=4. ePDCCH detecting clusters 0 and 1 may be in the distributed ePDCCH transmission mode. ePDCCH detecting clusters 2 and 3 may be in the localized ePDCCH transmission mode.

The distributed ePDCCH transmission mode may correspond to search space position or search space starting position X0.

The localized ePDCCH transmission mode may correspond to search space position or search space starting position X1.

Sub-Embodiment 2 of Embodiment 14

For example, 2 ePDCCH detecting clusters (K=2), namely, ePDCCH detecting cluster 0 and ePDCCH detecting cluster 1, may be configured.

ePDCCH detecting cluster 0 may correspond to search space position or search space starting position X0.

ePDCCH detecting cluster 1 may correspond to search space position or search space starting position X1.

Embodiment 15

An eNB may configure, through UE higher-layer signaling, K(K≥1) ePDCCH detecting clusters for a UE. In addition, when K is given a special value, the eNB may independently configure, through UE dedicated higher-layer signaling, a DCI Format detecting set in detection with an ePDCCH detecting cluster or any ePDCCH detecting cluster with a certain transmission mode. The UE may receive the K ePDCCH detecting clusters configured by the eNB and one or more search space positions or search space starting positions independently configured.

Sub-Embodiment 1 of Embodiment 15

For example, 4 ePDCCH detecting clusters may be configured, that is, K=4. ePDCCH detecting clusters 0 and 1 may be in the distributed ePDCCH transmission mode. ePDCCH detecting clusters 2 and 3 may be in the localized ePDCCH transmission mode.

The distributed ePDCCH transmission mode may correspond to a DCI Format detecting set X0.

The localized ePDCCH transmission mode may correspond to a DCI Format detecting set X1.

Sub-Embodiment 2 of Embodiment 15

For example, 2 ePDCCH detecting clusters (K=2), namely, ePDCCH detecting cluster 0 and ePDCCH detecting cluster 1, may be configured.

ePDCCH detecting cluster 0 may correspond to a DCI Format detecting set X0.

ePDCCH detecting cluster 1 may correspond to a DCI Format detecting set X1.

Embodiment 16

An eNB may configure, through UE higher-layer signaling, K(K≥1) ePDCCH detecting clusters for a UE. In addition, when K is given a special value and the number of ePDCCH detecting clusters in the distributed ePDCCH transmission mode is proportional to that in the localized ePDCCH transmission mode, the eNB may independently configure, through UE dedicated higher-layer signaling, a DCI Format detecting set in detection with an ePDCCH detecting cluster or any ePDCCH detecting cluster with a certain transmission mode. The UE may receive the K ePDCCH detecting clusters configured by the eNB and one or more search space positions or search space starting positions independently configured.

Sub-Embodiment 1 of Embodiment 16

For example, 4 ePDCCH detecting clusters may be configured, that is, K=4. ePDCCH detecting clusters 0 and 1 may be in the distributed ePDCCH transmission mode. ePDCCH detecting clusters 2 and 3 may be in the localized ePDCCH transmission mode. That is, the ratio of the number of ePDCCH detecting clusters in the distributed ePDCCH transmission mode to that in the localized ePDCCH transmission mode is 2:2.

The distributed ePDCCH transmission mode may correspond to a DCI Format detecting set X0.

The localized ePDCCH transmission mode may correspond to a DCI Format detecting set X1.

Sub-Embodiment 2 of Embodiment 16

For example, 4 ePDCCH detecting clusters may be configured, that is, K=4. ePDCCH detecting clusters 0 and 1 may be in the distributed ePDCCH transmission mode. ePDCCH detecting clusters 2 and 3 may be in the localized ePDCCH transmission mode. That is, the ratio of the number of ePDCCH detecting clusters in the distributed ePDCCH transmission mode to that in the localized ePDCCH transmission mode is 2:2.

ePDCCH detecting cluster 0 may correspond to a DCI Format detecting set X0.

ePDCCH detecting cluster 1 may correspond to a DCI Format detecting set X0.

ePDCCH detecting cluster 2 may correspond to a DCI Format detecting set X1.

ePDCCH detecting cluster 3 may correspond to a DCI Format detecting set X1.

Embodiment 17

An eNB may notify, through UE dedicated higher-layer signaling and/or physical layer signaling, an ePDCCH UE whether to assume that a time-frequency resource sharing DMRS antenna port is used for ePDCCH transmission or PDSCH transmission by another user.

The UE may learn, by receiving UE dedicated higher-layer signaling and/or physical layer signaling, whether to assume in ePDCCH resource detection that a time-frequency resource sharing DMRS antenna port is used for ePDCCH transmission or PDSCH transmission by another user.

The DMRS antenna port may include ports 107, 108, 109, and 110. Ports 107 and 108 share a time-frequency resource, and ports 109 and 110 share a time-frequency resource.

Sub-Embodiment 1 of Embodiment 17

By configuring K ePDCCH detecting clusters, the eNB may independently configure whether the UE assumes in the K ePDCCH detecting clusters that a time-frequency resource sharing DMRS antenna port is used for ePDCCH transmission or PDSCH transmission by another user.

The UE may obtain, by receiving UE higher-layer signaling, the K ePDCCH detecting clusters configured; receive independently configured channel estimation higher-layer signaling that signals the UE whether to assume in ePDCCH resource detection in the K ePDCCH detecting clusters that a time-frequency resource sharing DMRS antenna port is used for ePDCCH transmission or PDSCH transmission by another user; and perform, according to the received higher-layer signaling, DMRS channel estimation.

Sub-Embodiment 2 of Embodiment 17

By configuring K ePDCCH detecting clusters, the eNB may configure whether the UE assumes in part or all of the K clusters that a time-frequency resource sharing DMRS antenna port is used for ePDCCH transmission or PDSCH transmission by another user.

The UE may obtain, through UE dedicated higher-layer signaling, K ePDCCH detecting clusters configured; and learn whether the UE is configured to assume in ePDCCH resource detection in part or all of the K ePDCCH detecting clusters that a time-frequency resource sharing DMRS antenna port is used for ePDCCH transmission or PDSCH transmission by another UE.

Sub-embodiment 3 of Embodiment 17

The eNB may configure X subframe clusters, and configure whether the UE assumes in part or all of the X subframe clusters that a time-frequency resource sharing DMRS antenna port is used for ePDCCH transmission or PDSCH transmission by another user.

The UE may obtain, through UE dedicated higher-layer signaling, X (X>0) subframe clusters configured; and learn whether the UE is configured to assume in ePDCCH resource detection in part or all of the X subframe clusters that a time-frequency resource sharing DMRS antenna port is used for ePDCCH transmission or PDSCH transmission by another user.

Embodiment 18

In ePDCCH resource detection, a UE may always assume that a time-frequency resource sharing DMRS antenna port is not used for ePDCCH transmission or PDSCH transmission by another user.

The DMRS antenna port may be configured for ePDCCH demodulation and may include ports 107, 108, 109, and 110. Ports 107 and 108 share a time-frequency resource. Ports 109 and 110 share a time-frequency resource.

Embodiment 19

A UE may determine, according to an ePDCCH transmission mode, whether to assume in ePDCCH resource detection that a time-frequency resource sharing DMRS antenna port is used for ePDCCH transmission or PDSCH transmission by another UE.

With a localized transmission mode, the UE may always assume in ePDCCH resource detection that a time-frequency resource sharing DMRS antenna port is not used for ePDCCH transmission or PDSCH transmission by another UE.

With a distributed transmission mode, the UE has to assume in ePDCCH resource detection that a time-frequency resource sharing DMRS antenna port is used for ePDCCH transmission or PDSCH transmission by another UE.

The DMRS antenna port may be configured for ePDCCH demodulation and may include ports 107, 108, 109, and 110. Ports 107 and 108 share a time-frequency resource. Ports 109 and 110 share a time-frequency resource.

With a configuring and detecting method for an enhanced downlink control channel provided herein, an eNB side may flexibly configure, for a UE, an ePDCCH detecting parameter, enabling flexible dynamic ePDCCH switch between multiple TPs, more flexible ePDCCH scheduling information configuration by the eNB side, and improved ePDCCH stability.

FIG. 1 is a schematic diagram of a structure of a configuring device for an enhanced downlink control channel according to an embodiment herein. As shown in FIG. 1, a configuring device for an enhanced downlink control channel may include a first configuring unit 10 and a second configuring unit 11.

The first configuring unit 10 may be configured for: configuring, for a UE, K ePDCCH detecting clusters.

The second configuring unit 11 may be configured for: independently configuring an antenna port indicator of a DeModulation Reference Signal (DMRS) in detection with an ePDCCH detecting cluster or any ePDCCH detecting cluster with a transmission mode in the K ePDCCH detecting clusters;

and/or independently configuring a scrambling sequence or a scrambling sequence indicator of a DMRS in detection with an ePDCCH detecting cluster or any ePDCCH detecting cluster with a transmission mode in the K ePDCCH detecting clusters;

and/or independently configuring correspondence between a scrambling sequence of a DMRS in detection with an ePDCCH detecting cluster or any ePDCCH detecting cluster with a transmission mode in the K ePDCCH detecting clusters and a scrambling sequence of a DMRS of a Physical Downlink Shared Channel (PDSCH);

and/or independently configuring a Common Reference Signal (CRS) rate matching resource in detection with an ePDCCH detecting cluster or any ePDCCH detecting cluster with a transmission mode in the K ePDCCH detecting clusters;

and/or independently configuring a resource element available for ePDCCH transmission in detection with an ePDCCH detecting cluster or any ePDCCH detecting cluster with a transmission mode in the K ePDCCH detecting clusters;

and/or independently configuring a starting symbol position for ePDCCH detection in detection with an ePDCCH detecting cluster or any ePDCCH detecting cluster with a transmission mode in the K ePDCCH detecting clusters;

and/or independently configuring a Channel State Information (CSI) measuring process configuration in detection with an ePDCCH detecting cluster or any ePDCCH detecting cluster with a transmission mode in the K ePDCCH detecting clusters;

and/or independently configuring a Non-Zero Power (NZP) CSI-RS configuration in detection with an ePDCCH detecting cluster or any ePDCCH detecting cluster with a transmission mode in the K ePDCCH detecting clusters;

and/or independently configuring a Downlink Control Information (DCI) Format or a DCI Format set in detection with an ePDCCH detecting cluster or any ePDCCH detecting cluster with a transmission mode in the K ePDCCH detecting clusters;

and/or independently configuring an ePDCCH detecting subframe cluster in detection with an ePDCCH detecting cluster or any ePDCCH detecting cluster with a transmission mode in the K ePDCCH detecting clusters;

and/or independently configuring at least one of an aggregation level, a search space starting position, and a search space position in detection with an ePDCCH detecting cluster or any ePDCCH detecting cluster with a transmission mode in the K ePDCCH detecting clusters;

and/or independently predefining or independently configuring a default parametric value or a default behavior of an ePDCCH detecting cluster or any ePDCCH detecting cluster with a transmission mode in the K ePDCCH detecting clusters when the parameter or behavior is not indicated or acquired;

and/or configuring two or more ePDCCH detecting subframe clusters, each with an ePDCCH detecting cluster configuration and/or with ePDCCH detection or PDCCH detection; the ePDCCH detecting cluster configuration including at least one of a number of detecting clusters, an aggregation level to be detected in a detecting cluster, and a resource position to be detected in the detecting cluster.

An antenna port of the DMRS in detection with an ePDCCH detecting cluster or any ePDCCH detecting cluster with a transmission mode in the K ePDCCH detecting clusters may be at least one of ports 107, 108, 109, and 110.

The correspondence between a scrambling sequence of a DMRS in detection with an ePDCCH detecting cluster or any ePDCCH detecting cluster with a transmission mode in the K ePDCCH detecting clusters and a scrambling sequence of a DMRS of a PDSCH may be configured independently by: when the DMRS of the PDSCH may be configured with a scrambling sequence identifier, independently configuring correspondence between the scrambling sequence of the DMRS in detection with an ePDCCH detecting cluster in the K ePDCCH detecting clusters and the scrambling sequence of the DMRS of the PDSCH.

The CRS rate matching resource in detection with an ePDCCH detecting cluster or any ePDCCH detecting cluster with a transmission mode in the K ePDCCH detecting clusters may include at least one of a CRS port number, a CRS frequency domain position, and a CRS cell Identitfier.

The resource element available for ePDCCH in detection with an ePDCCH detecting cluster or any ePDCCH detecting cluster with a transmission mode in the K ePDCCH detecting clusters may include at least one of the CRS rate matching resource, a Zero Power (ZP) CSI-RS rate matching resource, an ePDCCH starting symbol, a special subframe configuration, and a cyclic prefix (CP) length configuration.

An ePDCCH starting symbol ID set in detection with an ePDCCH detecting cluster or any ePDCCH detecting cluster with a transmission mode in the K ePDCCH detecting clusters may include at least one of: a set $\{0, 1, 2, 3, 4\}$ or a set consisting of one or more ePDCCH starting symbol IDs obtained by Physical Control Format Indicator Channel (PCFICH) detection.

A CSI measuring process configuration in detection with an ePDCCH detecting cluster or any ePDCCH detecting cluster with a transmission mode in the K ePDCCH detecting clusters may be independently configured by: in configuring a CSI measuring process for the UE, adopting information relevant to the configured CSI measuring process as large-scale information required in detection with an ePDCCH detecting cluster or any ePDCCH detecting cluster with a transmission mode in the K ePDCCH detecting clusters. The large-scale information may include at least one of a delay expansion corresponding to the CSI measuring process, a path delay corresponding to the CSI measuring process, a Doppler shift corresponding to the CSI measuring process, a Doppler expansion corresponding to the CSI measuring process, and an average received power corresponding to the CSI measuring process. The CSI measuring process may include one of a measuring resource of the CSI measuring process, a measuring resource configured for: a CSI measuring subframe cluster and the CSI measuring process, and an NZP CSI-RS measuring resource.

An NZP CSI-RS configuration in detection with an ePDCCH detecting cluster or any ePDCCH detecting cluster with a transmission mode in the K ePDCCH detecting clusters may be independently configured by: in configuring a measuring set for the UE, adopting information relevant to a NZP CSI-RS in a configured measuring set as large-scale information required in detection with an ePDCCH detecting cluster or any ePDCCH detecting cluster with a transmission mode in the K ePDCCH detecting clusters.

A DCI Format or a DCI Format set in detection with an ePDCCH detecting cluster or any ePDCCH detecting cluster with a transmission mode in the K ePDCCH detecting clusters may be independently configured by: independently configuring the DCI Format or the DCI Format set the UE may be to detect in an ePDCCH detecting cluster or any ePDCCH detecting cluster with a transmission mode in the K ePDCCH detecting clusters.

An ePDCCH detecting subframe cluster in detection with an ePDCCH detecting cluster or any ePDCCH detecting cluster with a transmission mode in the K ePDCCH detecting clusters may be independently configured by: independently configuring, for an ePDCCH detecting cluster or any ePDCCH detecting cluster with a transmission mode in the K ePDCCH detecting clusters, an ePDCCH detecting subframe cluster. The ePDCCH detecting subframe cluster may inform the UE of a subframe where to detect an ePDCCH and a subframe where to detect a PDCCH, or instructing the UE to use different ePDCCH detecting cluster configurations in different subframe clusters. An ePDCCH detecting subframe cluster in detection with an ePDCCH detecting cluster or any ePDCCH detecting cluster with a transmission mode in the K ePDCCH detecting clusters may be independently configured by: independently configuring, for an ePDCCH detecting cluster or any ePDCCH detecting cluster with a transmission mode in the K ePDCCH detecting clusters, an ePDCCH detecting subframe cluster. The ePDCCH detecting subframe cluster may inform the UE of a subframe where to detect an ePDCCH dedicated search space and a subframe where to detect a PDCCH dedicated search space.

PUCCH dynamic resource position indicator signaling in HARQ feedback may be independently configured for: an ePDCCH detecting cluster or any ePDCCH detecting cluster with a transmission mode in the K ePDCCH detecting clusters to instruct the UE to use independently configured PUCCH dynamic resource position indicator signaling in downlink data HARQ feedback indicated in an ePDCCH.

Based on what shown in FIG. 1, the device may further include:

a determining unit (not shown in FIG. 11) configured for: when two or more antenna ports of the DMRS in detection with an ePDCCH detecting cluster or any ePDCCH detecting cluster with a transmission mode in the K ePDCCH detecting clusters are configured, determining one of the two or more antenna ports of the DMRS as a detecting port according to one or more of an enhanced control Channel unit eCCE, a Cell Radio Network Temporary Identitfier (C-RNTI), and a predefined rule.

Those skilled in the art will know that the determining unit is set only as an option for optimizing the configuring device for an enhanced downlink control channel herein.

A transmission mode may include a localized transmission mode and a distributed transmission mode.

The second configuring unit 11 may be further configured for: configuring a DCI Format set for a K;

configuring a DCI Format set for K ePDCCH detecting clusters, any ePDCCH detecting cluster with the distributed transmission mode, or any ePDCCH detecting cluster with the localized transmission mode; and configuring a DCI Format set for detection with an ePDCCH detecting cluster.

Those skilled in the art will know that function of a unit of the configuring device shown in FIG. 1 may be understood referring to description for the configuring and detecting method. Those skilled in the art will know that function of a unit of the configuring device shown in FIG. 1 may be implemented through a program run on a processor, or through a specific logic circuit.

Further disclosed herein is an eNB, including the configuring device for an enhanced downlink control channel shown in FIG. 1.

Figure 2:
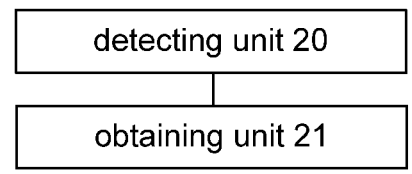
FIG. 2 is a schematic diagram of a structure of a device for detecting an enhanced downlink control channel according to an embodiment herein.

FIG. 2 is a schematic diagram of a structure of a device for detecting an enhanced downlink control channel according to an embodiment herein. As shown in FIG. 2, the device for detecting an enhanced downlink control channel may include a detecting unit and an obtaining unit 21.

The detecting unit 20 may be configured for: detecting an enhanced downlink control channel.

The obtaining unit 21 may be configured for: obtaining an antenna port indicator of a DeModulation Reference Signal (DMRS) in detection with an Enhanced PDCCH (ePDCCH) detecting cluster or any ePDCCH detecting cluster with a transmission mode in K ePDCCH detecting clusters;

and/or obtaining a scrambling sequence indicator of a DMRS in detection with an ePDCCH detecting cluster or any ePDCCH detecting cluster with a transmission mode in the K ePDCCH detecting clusters;

and/or obtaining correspondence between a scrambling sequence of a DMRS in detection with an ePDCCH detecting cluster or any ePDCCH detecting cluster with a transmission mode in the K ePDCCH detecting clusters and a scrambling sequence of a DMRS of a Physical Downlink Shared Channel (PDSCH);

and/or obtaining a Common Reference Signal (CRS) rate matching resource in detection with an ePDCCH detecting cluster or any ePDCCH detecting cluster with a transmission mode in the K ePDCCH detecting clusters;

and/or obtaining a resource element available for ePDCCH transmission in detection with an ePDCCH detecting cluster or any ePDCCH detecting cluster with a transmission mode in the K ePDCCH detecting clusters;

and/or obtaining an ePDCCH starting symbol ID set in detection with an ePDCCH detecting cluster or any ePDCCH detecting cluster with a transmission mode in the K ePDCCH detecting clusters;

and/or obtaining a Channel State Information (CSI) measuring process configuration in detection with an ePDCCH detecting cluster or any ePDCCH detecting cluster with a transmission mode in the K ePDCCH detecting clusters;

and/or obtaining a Non-Zero Power (NZP) CSI-RS configuration in detection with an ePDCCH detecting cluster or any ePDCCH detecting cluster with a transmission mode in the K ePDCCH detecting clusterss;

and/or obtaining a Downlink Control Information (DCI) Format or a DCI Format set in detection with an ePDCCH detecting cluster or any ePDCCH detecting cluster with a transmission mode in the K ePDCCH detecting clusters;

and/or obtaining an ePDCCH detecting subframe cluster in detection with an ePDCCH detecting cluster or any ePDCCH detecting cluster with a transmission mode in the K ePDCCH detecting clusters;

and/or obtaining an aggregation level and a search space starting position in detection with an ePDCCH detecting cluster or any ePDCCH detecting cluster with a transmission mode in the K ePDCCH detecting clusters;

and/or independently predefining or independently configuring a default parametric value or a default behavior of an ePDCCH detecting cluster or any ePDCCH detecting cluster with a transmission mode in the K ePDCCH detecting clusters when the parameter or behavior is not acquired;

and/or when two or more ePDCCH detecting subframe clusters are obtained, for different ePDCCH detecting subframe clusters, performing detection with different ePDCCH detecting cluster configurations and/or adopting ePDCCH detection or PDCCH detection. An ePDCCH detecting cluster configuration may include at least one of a number of detecting clusters, an aggregation level to be detected in a detecting cluster, and a resource position to be detected in the detecting cluster.

An antenna port of the DMRS in detection with an ePDCCH detecting cluster or any ePDCCH detecting cluster with a transmission mode in the K ePDCCH detecting clusters may be at least one of ports 107, 108, 109, and 110.

The correspondence between a scrambling sequence of a DMRS in detection with an ePDCCH detecting cluster or any ePDCCH detecting cluster with a transmission mode in the K ePDCCH detecting clusters and a scrambling sequence of a DMRS of a PDSCH may be independently configured by: when the DMRS of the PDSCH is configured with a scrambling sequence identifier, independently configuring correspondence between the scrambling sequence of the DMRS in detection with an ePDCCH detecting cluster in the K ePDCCH detecting clusters and the scrambling sequence of the DMRS of the PDSCH.

The CRS rate matching resource in detection with an ePDCCH detecting cluster or any ePDCCH detecting cluster with a transmission mode in the K ePDCCH detecting clusters may include at least one of a CRS port number, a CRS frequency domain position, and a CRS cell Identifier.

The resource element available for ePDCCH in detection with an ePDCCH detecting cluster or any ePDCCH detecting cluster with a transmission mode in the K ePDCCH detecting clusters may include at least one of the CRS rate matching resource, a Zero Power (ZP) CSI-RS rate matching resource, an ePDCCH starting symbol, a special subframe configuration, and a cyclic prefix (CP) length configuration.

The ePDCCH starting symbol ID set in detection with an ePDCCH detecting cluster or any ePDCCH detecting cluster with a transmission mode in the K ePDCCH detecting clusters may include at least one of: a set {0, 1, 2, 3, 4} or a set consisting of one or more ePDCCH starting symbol IDs obtained by Physical Control Format Indicator Channel (PCFICH) detection.

The CSI measuring process configuration in detection with an ePDCCH detecting cluster or any ePDCCH detecting cluster with a transmission mode in the K ePDCCH detecting clusters may be independently configured by: in configuring a CSI measuring process for the UE, adopting information relevant to the configured CSI measuring process as large-scale information required in detection with an ePDCCH detecting cluster or any ePDCCH detecting cluster with a transmission mode in the K ePDCCH detecting clusters. The large-scale information may include at least one of a delay expansion corresponding to the CSI measuring process, a path delay corresponding to the CSI measuring process, a Doppler shift corresponding to the CSI measuring process, a Doppler expansion corresponding to the CSI measuring process, and an average received power corresponding to the CSI measuring process. The CSI measuring process may include one of a measuring resource of the CSI measuring process, a measuring resource configured for: a CSI measuring subframe cluster and the CSI measuring process, and an NZP CSI-RS measuring resource;

The NZP CSI-RS configuration in detection with an ePDCCH detecting cluster or any ePDCCH detecting cluster with a transmission mode in the K ePDCCH detecting clusters may be independently configured by: in configuring a measuring set for the UE, adopting information relevant to a NZP CSI-RS in a configured measuring set as large-scale information required in detection with an ePDCCH detecting cluster or any ePDCCH detecting cluster with a transmission mode in the K ePDCCH detecting clusters.

The DCI Format or the DCI Format set in detection with an ePDCCH detecting cluster or any ePDCCH detecting cluster with a transmission mode in the K ePDCCH detecting clusters may be independently configured by: independently configuring the DCI Format or the DCI Format set the UE is to detect in an ePDCCH detecting cluster or any ePDCCH detecting cluster with a transmission mode in the K ePDCCH detecting clusters.

The ePDCCH detecting subframe cluster in detection with an ePDCCH detecting cluster or any ePDCCH detecting cluster with a transmission mode in the K ePDCCH detecting clusters may be independently configured by: independently configuring, for an ePDCCH detecting cluster or any ePDCCH detecting cluster with a transmission mode in the K ePDCCH detecting clusters, an ePDCCH detecting subframe cluster. An ePDCCH detecting subframe cluster may inform the UE of a subframe where to detect an ePDCCH and a subframe where to detect a PDCCH, or instructing the UE to use different ePDCCH detecting cluster configurations in different subframe clusters. The ePDCCH detecting subframe cluster in detection with an ePDCCH detecting cluster or any ePDCCH detecting cluster with a transmission mode in the K ePDCCH detecting clusters may be independently configured by: independently configuring, for an ePDCCH detecting cluster or any ePDCCH detecting cluster with a transmission mode in the K ePDCCH detecting clusters, an ePDCCH detecting subframe cluster. An ePDCCH detecting subframe cluster may inform the UE of a subframe where to detect an ePDCCH dedicated search space and a subframe where to detect a PDCCH dedicated search space.

PUCCH dynamic resource position indicator signaling in HARQ feedback may be independently configured for: an ePDCCH detecting cluster or any ePDCCH detecting cluster with a transmission mode in the K ePDCCH detecting clusters to instruct the UE to use independently configured PUCCH dynamic resource position indicator signaling in downlink data HARQ feedback indicated in an ePDCCH.

Based on what shown in FIG. 2, the device for detecting an enhanced downlink control channel may further include:

a determining unit (not shown in FIG. 2) configured for: when two or more antenna ports of the DMRS in detection with an ePDCCH detecting cluster or any ePDCCH detecting cluster with a transmission mode in the K ePDCCH detecting clusters are obtained by the obtaining unit, determining one of the two or more antenna ports of the DMRS as a detecting port according to one or more of an enhanced control Channel unit eCCE, a Cell Radio Network Temporary Identitfier (C-RNTI), and a predefined rule.

Those skilled in the art will know that the determining unit is set only as an option for optimizing the device for detecting an enhanced downlink control channel.

A transmission mode may include a localized transmission mode and a distributed transmission mode.

The detecting unit 20 may be further configured for: performing detection using a DCI Format set for a K;

performing detection using a DCI Format set for K ePDCCH detecting clusters, any ePDCCH detecting cluster with the distributed transmission mode, or any ePDCCH detecting cluster with the localized transmission mode; and performing detection using a DCI Format set for detection with an ePDCCH detecting cluster.

Those skilled in the art will know that function of a unit of the device for detecting an enhanced downlink control channel shown in FIG. 2 may be understood referring to description for the configuring and detecting method. Those skilled in the art will know that function of a unit of the device for detecting an enhanced downlink control channel shown in FIG. 2 may be implemented through a program run on a processor, or through a specific logic circuit.

Also disclosed is a UE, including the device for detecting an enhanced downlink control channel shown in FIG. 2.

Apparently, Those skilled in the art will know that modules or steps in embodiments of the disclosure may be realized using a universal computing device, and may be integrated in a single computing device or distributed in a network formed by multiple computing devices. Optionally, they may be realized using computing device executable program codes, and thus may be stored in a storage device and executed by a computing device. The steps may each be made into an Integrated Circuit module. Multiple modules or steps herein may be realized by being made into a single Integrated Circuit module. Thus, an embodiment of the disclosure is not limited to a specific combination of hardware and software.

What described are merely embodiments of the disclosure, and are not intended to limit the scope of the present disclosure.

INDUSTRIAL APPLICABILITY

With a technical solution herein, an eNB side may flexibly configure, for a UE, an ePDCCH detecting parameter, enabling flexible dynamic ePDCCH switch between multiple TPs, more flexible ePDCCH scheduling information configuration by the eNB side, and improved ePDCCH stability.

The invention claimed is:

1. A configuring method for an enhanced downlink control channel, comprising: configuring, by an evolved Node B (eNB) for a User Equipment (UE), K Enhanced PDCCH (ePDCCH) detecting clusters through UE higher-layer signaling, where the K is an integer greater than 1; and independently configuring, by the eNB through UE dedicated higher-layer signaling, an ePDCCH detecting parameter for each of the K ePDCCH detecting clusters or for each of ePDCCH transmission modes, wherein the ePDCCH transmission modes comprise a localized ePDCCH transmission mode and a distributed ePDCCH transmission mode, wherein each of the K ePDCCH detecting clusters is configured to be in either the localized ePDCCH transmission mode or the distributed ePDCCH transmission mode, wherein the ePDCCH detecting parameter comprises at least one of: an antenna port of a DeModulation Reference Signal (DMRS); a scrambling sequence or a scrambling sequence indicator of a DMRS; a Common Reference Signal (CRS) rate matching resource; a resource element available for ePDCCH transmission; an ePDCCH starting symbol ID set; a Channel State Information (CSI) measuring process configuration; a Non-Zero Power (NZP) CSI-RS configuration; an ePDCCH detecting subframe cluster; at least one of an aggregation level, a search space starting position, and a search space position, such that the UE receives the configuration of the K ePDCCH detecting clusters by the eNB and the ePDCCH detecting parameter independently configured by the eNB for each of the K ePDCCH detecting clusters or for each of the ePDCCH transmission modes, and performs ePDCCH reception and detection according to the received configuration of the K ePDCCH detecting clusters and the received ePDCCH detecting parameter.

2. The method according to claim 1, wherein an antenna port of the DMRS for a K ePDCCH detecting cluster or for an ePDCCH transmission mode is at least one of 107, 108, 109, and 110.

3. The method according to claim 2, wherein when two or more antenna ports of the DMRS configured for a K ePDCCH detecting cluster or for an ePDCCH transmission mode, one of the two or more antenna ports of the DMRS is determined as a detecting port according to one or more of an enhanced control Channel unit (eCCE), a Cell Radio Network Temporary Identitfier (C-RNTI), and a predefined rule.

4. The method according to claim 1, wherein the CRS rate matching resource for a K ePDCCH detecting cluster or for an ePDCCH transmission mode comprises at least one of a CRS port number, a CRS frequency domain position, and a CRS cell Identitfier.

5. The method according to claim 1, wherein the resource element available for ePDCCH transmission for a K ePDCCH detecting cluster or for an ePDCCH transmission mode comprises at least one of the CRS rate matching resource, a Zero Power (ZP) CSI-RS rate matching resource, an ePDCCH starting symbol, a special subframe configuration, and a cyclic prefix (CP) length configuration.

6. The method according to claim 1, wherein the ePDCCH starting symbol ID set for a K ePDCCH detecting cluster or for an ePDCCH transmission mode comprises at least one of a set {0, 1, 2, 3, 4} or a set consisting of one or more ePDCCH starting symbol IDs obtained by Physical Control Format Indicator Channel (PCFICH) detection.

7. The method according to claim 1, wherein the NZP CSI-RS configuration for a K ePDCCH detecting cluster or for an ePDCCH transmission mode comprises:

information relevant to a NZP CSI-RS in a measuring set configured for the UE, as large-scale information required for the K ePDCCH detecting cluster or for the ePDCCH transmission mode, wherein the large-scale information comprises at least one of a delay expansion corresponding to the NZP CSI-RS, a path delay corresponding to the NZP CSI-RS, a Doppler shift corresponding to the NZP CSI-RS, a Doppler expansion corresponding to the NZP CSI-RS, and an average received power corresponding to the NZP CSI-RS.

8. A method for detecting an enhanced downlink control channel, comprising: receiving, by a User Equipment (UE), configuration of K Enhanced PDCCH (ePDCCH) detecting clusters sent by an evolved Node B (eNB) through UE higher-layer signaling, where the K is an integer greater than 1;

receiving, by the UE, an ePDCCH detecting parameter independently configured for each of the K ePDCCH detecting clusters or for each of ePDCCH transmission modes by the eNB through UE dedicated higher-layer signaling, wherein the ePDCCH transmission modes comprise a localized ePDCCH transmission mode and a distributed ePDCCH transmission mode, wherein each of the K ePDCCH detecting clusters is configured to be in either the localized ePDCCH transmission mode or the distributed ePDCCH transmission mode, wherein the ePDCCH detecting parameter comprises at least one of: an antenna port of a DeModulation Reference Signal (DMRS); a scrambling sequence or a scrambling sequence indicator of a DMRS; a Common Reference Signal (CRS) rate matching resource; a resource element available for ePDCCH transmission; an ePDCCH starting symbol ID set; a Channel State Information (CSI) measuring process configuration; a Non-Zero Power (NZP) CSI-RS configuration; an ePDCCH detecting subframe cluster; at least one of an aggregation level, a search space starting position, and a search space position; and performing, by the UE, ePDCCH reception and detection according to the received configuration of the K ePDCCH detecting clusters and the received ePDCCH detecting parameter.

9. The method according to claim 8, wherein an antenna port of the DMRS for a K ePDCCH detecting cluster or for an ePDCCH transmission mode is at least one of 107, 108, 109, and 110;

the CRS rate matching resource for a K ePDCCH detecting cluster or for an ePDCCH transmission mode comprises at least one of a CRS port number, a CRS frequency domain position, and a CRS cell Identitfier;

the resource element available for ePDCCH transmission for a K ePDCCH detecting cluster or for an ePDCCH transmission mode comprises at least one of a comprises at least one of the CRS rate matching resource, a Zero Power (ZP) CSI-RS rate matching resource, an ePDCCH starting symbol, a special subframe configuration, and a cyclic prefix (CP) length configuration;

the ePDCCH starting symbol ID set for a K ePDCCH detecting cluster or for an ePDCCH transmission mode comprises at least one of: a set {0, 1, 2, 3, 4} or a set consisting of one or more ePDCCH starting symbol IDs obtained by Physical Control Format Indicator Channel (PCFICH) detection;

the NZP CSI-RS configuration for a K ePDCCH detecting cluster or for an ePDCCH transmission mode comprises: information relevant to a NZP CSI-RS in a measuring set configured for the UE, as large-scale information required for the K ePDCCH detecting cluster or for the ePDCCH transmission mode, wherein the large-scale information comprises at least one of: a delay expansion corresponding to the NZP CSI-RS, a path delay corresponding to the NZP CSI-RS, a Doppler shift corresponding to the NZP CSI-RS, a Doppler expansion corresponding to the NZP CSI-RS, and an average received power corresponding to the NZP CSI-RS.

10. The method according to claim 9, wherein when two or more antenna ports of the DMRS are received for a K ePDCCH detecting cluster or for an ePDCCH transmission mode, one of the two or more antenna ports of the DMRS is determined as a detecting port according to one or of an enhanced control Channel unit (eCCE), a Cell Radio Network Temporary Identitfier (C-RNTI), and a predefined rule.

11. An evolved Node B (eNB), comprising:
at least one hardware processor;
memory in electronic communication with the at least one hardware processor storing instructions executable by the at least one hardware processor for:
configuring, for a User Equipment (UE), K Enhanced PDCCH (ePDCCH) detecting clusters through UE higher-layer signaling, where the K is an integer greater than 1; and
independently configuring, through UE dedicated higher-layer signaling, an ePDCCH detecting parameter for each of the K ePDCCH detecting clusters or for each of ePDCCH transmission modes,
wherein the ePDCCH transmission modes comprise a localized ePDCCH transmission mode and a distributed ePDCCH transmission mode,
wherein each of the K ePDCCH detecting clusters is configured to be in either the localized ePDCCH transmission mode or the distributed ePDCCH transmission mode,
wherein the ePDCCH detecting parameter comprises at least one of: an antenna port of a DeModulation Reference Signal (DMRS); a scrambling sequence or a scrambling sequence indicator of a DMRS; a Common Reference Signal (CRS) rate matching resource; a resource element available for ePDCCH transmission; an ePDCCH starting symbol ID set; a Channel State Information (CSI) measuring process configuration; a Non-Zero Power (NZP) CSI-RS configuration; an ePDCCH detecting subframe cluster; at least one of an aggregation level, a search space starting position, and a search space position, such that the UE receives the configuration of the K ePDCCH detecting clusters by the eNB and the ePDCCH detecting parameter independently configured by the eNB for each of the K ePDCCH detecting clusters or for each of the ePDCCH transmission modes, and performs ePDCCH reception and detection according to the received configuration of the K ePDCCH detecting clusters and the received ePDCCH detecting parameter.

12. The eNB according to claim 11, wherein an antenna port of the DMRS for a K ePDCCH detecting cluster or for an ePDCCH transmission mode is at least one of 107, 108, 109, and 110;

the CRS rate matching resource for a K ePDCCH detecting cluster or for an ePDCCH transmission mode comprises at least one of a CRS port number, a CRS frequency domain position, and a CRS cell Identitfier;

the resource element available for ePDCCH transmission for a K ePDCCH detecting cluster or for an ePDCCH transmission mode comprises at least one of the CRS rate matching resource, a Zero Power (ZP) CSI-RS rate matching resource, an ePDCCH starting symbol, a special subframe configuration, and a cyclic prefix (CP) length configuration;

the ePDCCH starting symbol ID set for a K ePDCCH detecting cluster or for an ePDCCH transmission mode comprises at least one of: a set {0, 1, 2, 3, 4} or a set consisting of one or more ePDCCH starting symbol IDs obtained by Physical Control Format Indicator Channel PCFICH) detection;

the NZP CSI-RS configuration for a K ePDCCH detecting cluster or for an ePDCCH transmission mode comprises: information relevant to a NZP CSI-RS in a measuring set configured for the UE, as large-scale information required for the K ePDCCH detecting cluster or for the ePDCCH transmission mode, wherein the large-scale information comprises at least one of: a delay expansion corresponding to the NZP CSI-RS, a path delay corresponding to the NZP CSI-RS, a Doppler shift corresponding to the NZP CSI-RS, a Doppler expansion corresponding to the NZP CSI-RS, and an average received power corresponding to the NZP CSI-RS.

13. The eNB according to claim 12, wherein
when two or more antenna ports of the DMRS are configured for a K ePDCCH detecting cluster or for an ePDCCH transmission mode, one of the two or more antenna ports of the DMRS is determined as a detecting port according to one or more of an enhanced control Channel unit (eCCE), a Cell Radio Network Temporary Identitfier (C-RNTI), and a predefined rule.

14. A User Equipment (UE), comprising:
at least one hardware processor;
memory in electronic communication with the at least one hardware processor, storing instructions executable by the at least one hardware processor for:
receiving configuration of K Enhanced PDCCH (ePDCCH) detecting clusters sent by an evolved Node B (eNB) through UE higher-layer signaling, where the K is an integer greater than 1; and
receiving an ePDCCH detecting parameter independently configured for each of the K ePDCCH detecting clusters or for each of ePDCCH transmission modes by the eNB through UE dedicated higher-layer signaling,
wherein the ePDCCH transmission modes comprise a localized ePDCCH transmission mode and a distributed ePDCCH transmission mode, wherein each of the K ePDCCH detecting clusters is configured to be in either the localized ePDCCH transmission mode or the distributed ePDCCH transmission mode, wherein the ePDCCH detecting parameter comprises at least one of: an antenna port of a DeModulation Reference Signal (DMRS); a scrambling sequence or a scrambling sequence indicator of a DMRS; a Common Reference Signal (CRS) rate matching resource; a resource element available for ePDCCH transmission; an ePDCCH starting symbol ID set; a Channel State Information (CSI) measuring process configuration; a Non-Zero Power (NZP) CSI-RS configuration; an ePDCCH detecting subframe cluster; at least one of an aggregation level, a search space starting position, and a search space position; and performing, by the UE, ePDCCH reception and detection according to the received configuration of the K ePDCCH detecting clusters and the received ePDCCH detecting parameter.

15. The UE according to claim 14, wherein an antenna port of the DMRS for a K ePDCCH detecting cluster or for an ePDCCH transmission mode is at least one of 107, 108, 109, and 110;

the CRS rate matching resource for a K ePDCCH detecting cluster or for an ePDCCH transmission mode comprises at least one of a CRS port number, a CRS frequency domain position, and a CRS cell Identifier;

the resource element available for ePDCCH transmission for a K ePDCCH detecting cluster or for an ePDCCH transmission mode comprises at least one of the CRS rate matching resource, a Zero Power (ZP) CSI-RS rate matching resource, an ePDCCH starting symbol, a special subframe configuration, and a cyclic prefix (CP) length configuration;

the ePDCCH starting symbol ID set for a K ePDCCH detecting cluster or for an ePDCCH transmission mode comprises at least one of: a set {0, 1, 2, 3, 4} or a set consisting of one or more ePDCCH starting symbol IDs obtained by Physical Control Format Indicator Channel (PCFICH) detection;

the NZP CSI-RS configuration for a K ePDCCH detecting cluster or for an ePDCCH transmission mode comprises: information relevant to a NZP CSI-RS in a measuring set configured for the UE, as large-scale information required for the K ePDCCH detecting cluster or for the ePDCCH transmission mode, wherein the large-scale information comprises at least one of: a delay expansion corresponding to the NZP CSI-RS, path delay corresponding to the NZP CSI-RS, a Doppler shift corresponding to the NZP CSI-RS, a Doppler expansion corresponding to the NZP CSI-RS and an average received power corresponding to the NZP CSI-RS.

16. The UE according to claim 15, wherein when two or more antenna ports of the DMRS are received for a K ePDCCH detecting cluster or for an ePDCCH transmission mode one of the two or more antenna ports of the DMRS is determined as a detecting port according to one or more of an enhanced control Channel unit (eCCE), a Cell Radio Network Temporary Identitfier (C-RNTI), and a predefined rule.

* * * * *